(12) United States Patent
Lee et al.

(10) Patent No.: US 8,839,235 B2
(45) Date of Patent: Sep. 16, 2014

(54) USER TERMINAL DEVICE AND SERVICE PROVIDING METHOD THEREOF

(75) Inventors: Young-seop Lee, Yongin-si (KR); Nam-geol Lee, Seoul (KR); In-sung Cho, Gwangjul-si (KR)

(73) Assignee: Samsung Electronics Co., Ltd. (KR)

( * ) Notice: Subject to any disclaimer, the term of this patent is extended or adjusted under 35 U.S.C. 154(b) by 109 days.

(21) Appl. No.: 13/250,334

(22) Filed: Sep. 30, 2011

(65) Prior Publication Data

US 2012/0084773 A1 Apr. 5, 2012

(30) Foreign Application Priority Data

Sep. 30, 2010 (KR) ........................ 10-2010-0095542

(51) Int. Cl.
*G06F 9/445* (2006.01)
(52) U.S. Cl.
USPC ............................ 717/178; 717/152; 717/173
(58) Field of Classification Search
USPC .......................................................... 717/178
See application file for complete search history.

(56) References Cited

U.S. PATENT DOCUMENTS

| | | | |
|---|---|---|---|
| 7,069,293 B2 * | 6/2006 | Cox et al. | 709/203 |
| 7,143,409 B2 | 11/2006 | Herrero | |
| 7,237,235 B2 * | 6/2007 | Maeda | 717/152 |
| 7,779,408 B1 * | 8/2010 | Papineau | 717/178 |
| 7,783,729 B1 * | 8/2010 | Macaluso | 709/220 |
| 8,135,392 B2 * | 3/2012 | Marcellino et al. | 455/418 |
| 8,255,991 B1 * | 8/2012 | Hackborn et al. | 726/21 |
| 8,340,635 B2 * | 12/2012 | Herz et al. | 455/411 |
| 2003/0203731 A1 * | 10/2003 | King et al. | 455/407 |
| 2003/0236893 A1 | 12/2003 | Nakamura | |
| 2004/0039919 A1 * | 2/2004 | Takayama et al. | 713/180 |
| 2005/0166266 A1 * | 7/2005 | Taniguchi et al. | 726/22 |
| 2007/0123215 A1 | 5/2007 | Wang et al. | |
| 2009/0063179 A1 * | 3/2009 | Huang | 705/1 |
| 2010/0011354 A1 * | 1/2010 | Gharabally et al. | 717/178 |
| 2010/0161710 A1 * | 6/2010 | Stoner et al. | 709/203 |
| 2010/0251230 A1 * | 9/2010 | O'Farrell et al. | 717/173 |
| 2010/0257085 A1 * | 10/2010 | Bowne et al. | 705/35 |
| 2011/0191770 A1 * | 8/2011 | Inoue | 717/178 |
| 2011/0307354 A1 * | 12/2011 | Erman et al. | 705/27.1 |
| 2012/0117513 A1 * | 5/2012 | Kawai | 715/835 |

FOREIGN PATENT DOCUMENTS

| | | |
|---|---|---|
| JP | 2006287503 | 10/2006 |
| JP | 2008242644 | 10/2008 |
| JP | 2009017516 | 1/2009 |
| JP | 2009217556 | 9/2009 |
| KR | 1020040023840 | 3/2004 |

* cited by examiner

*Primary Examiner* — Don Wong
*Assistant Examiner* — Roberto E Luna
(74) *Attorney, Agent, or Firm* — The Farrell Law Firm, P.C.

(57) ABSTRACT

A method for providing a service in a user terminal device, in which the user terminal device downloads a service hub program, installs the service hub program, generates an icon container corresponding to the service hub program, displays the icon container, receives an input selecting the icon container, displays an application icon included in the icon container, and deletes a program and data installed in the user terminal device according to a change in status of the user terminal device.

25 Claims, 27 Drawing Sheets

FIG. 13
| Server homepage | |
|---|---|
| ID | [_____] |
| Password | [_____] [Login] |
| | | [Exit] [Logout] |
|---|---|---|
| 51 — Enterprise | Enterprise  55  56 | |
| 52 — SME | [List]  [Applications] | |
| 53 — SOHO | | |
| 54 — Applications | | |
| | Enterprises | Status | Country | No. of devices |
|---|---|---|---|---|
| 51 — Enterprise | ○○ hospital | activated | KOR | 100 |
| 52 — SME | △△ electronics | activated | KOR | 150 |
| 53 — SOHO | □□ chemical | deactivated | US | 130 |
| 54 — Applications | ×× firm | | | |
| | ⋮ | ⋮ | ⋮ | ⋮ |

FIG. 14

| | | 61 | 62 | 63 | 60 |

| Application | | | |
|---|---|---|---|
| Common | Industry | Specialized | |
| ☐ ID | App. Name | Note | |
| ☐ A 01 | App 01 | ------ | |
| ☐ A 02 | App 02 | ------ | |
| ☐ A 03 | App 03 | ------ | |
| ⋮ ⋮ | ⋮ | ⋮ | |

FIG. 16

71 — User management
72 — Service group
73 — Application management

User management

| | ID | Name | Status |
|---|---|---|---|
| ☐ | user 1 | ABC | activated |
| ☐ | admin 1 | AAA | activated |
| ☐ | user 2 | BBB | activated |
| ☐ | user x | CCC | activated |

All status ▼    Search ID ▼ 🔍

Exit  Logout

Modify  Add  Delete

FIG. 19

71 — User management
72 — Service group
73 — Application management

Application management    Exit   Logout

All status ▼    Search ID ▼ 🔍

| ☐ | ID | Name | Current No. of App. |
|---|----|------|---------------------|
| ☐ | abc 1 | AA hospital Surgery | 10 |
| ☐ | abc 2 | AA hospital Administrative | 20 |
| ⋮ | ⋮ | ⋮ | ⋮ |

Modify   Add   Delete

USER TERMINAL DEVICE AND SERVICE PROVIDING METHOD THEREOF

PRIORITY

This application claims priority under 35 U.S.C. §119 (a) to Korean Patent Application No. 2010-0095542, which was filed in the Korean Intellectual Property Office on Sep. 30, 2010, the entire disclosure of which is incorporated herein by reference.

BACKGROUND OF THE INVENTION

1. Field of the Invention

The present invention relates generally to a user terminal device and a service providing method thereof, and more particularly, to a user terminal device for collectively providing services via a service hub corresponding to a particular organization, and a service providing method thereof.

2. Description of the Related Art

A user of a user terminal device, such as a smart phone, can access an external server such as application store, in order to utilize various application programs in addition to application programs installed to the user terminal device. More specifically, the user can download and use a free or paid application program.

Further, as users of user terminal devices are increasing, various-scale organizations such as businesses, schools, hospitals, public institutions, etc., can use a specific application program in common. Hence, users belonging to these types of organizations individually download and utilize the specific application program.

However, for a user who is not familiar with the user terminal device, downloading and installing the application program can be difficult. In addition, when there are multiple application programs commonly required, it can be burdensome to search for and download each of the application programs.

Thus, when there are the application programs commonly used by a particular organization, a technique for easily downloading and using the application programs from a server is needed.

SUMMARY OF THE INVENTION

Accordingly, the present disclosure has been provided to solve the above-mentioned and/or other problems and disadvantages, and to provide at least the advantages described below.

An aspect of the present invention is to provide a user terminal device that receives a plurality of services via a service hub with respect to a certain organization and a service providing method thereof.

In accordance with an aspect of the present invention, a service providing method in a user terminal device is provided. The method includes downloading, by the user terminal device, a service hub program; installing the service hub program; generating an icon container corresponding to the service hub program; displaying the icon container; receiving an input selecting the icon container; displaying an application icon included in the icon container; and deleting a program and data installed in the user terminal device according to a change in status of the user terminal device.

In accordance with another aspect of the present invention, a user terminal device is provided. The user terminal device includes a memory that stores a service hub program and an application program corresponding to the service hub program; a display that displays an icon container corresponding to the service hub program; and a controller that controls the display to display an icon corresponding to the application program, when the icon container is selected, and deletes programs and data stored in the memory according to a change in status of the user terminal device.

In accordance with another aspect of the present invention, a user terminal device is provided. The user terminal device includes an authentication manager that performs authentication by transmitting unique information and user information of the user terminal device to a server; a download manager that downloads a service hub program, a list regarding an application program corresponding to the service hub program, and a list regarding an icon of the application program from the server, when authentication is successful; an icon generation manager that generates an icon container including an icon regarding the application program in the list regarding the application program corresponding to the service hub program; a display controller that displays the icon container on a display screen; and a deletion manager that deletes at least one of programs and data installed in the user terminal device according to a change in status of the user terminal device.

BRIEF DESCRIPTION OF THE DRAWING

The above and/or other aspects, features, and advantages of certain embodiments of the present invention will become apparent and more readily appreciated from the following description, when taken in conjunction with the accompanying drawings, of which:

FIG. 13 is a diagram illustrating a service hub registration process according to an embodiment of the present invention;

FIG. 14 is a diagram illustrating an application program setting process according to an embodiment of the present invention;

FIGS. 15 through 18 are diagrams illustrating service hub management of an operator of an organization assigned a server account according to an embodiment of the present invention;

FIG. 19 is a diagram illustrating a method for setting an application program per group according to an embodiment of the present invention;

DETAILED DESCRIPTION OF EMBODIMENTS OF THE INVENTION

Various embodiments of the present invention are described in detail below with reference to the accompanying drawings. In the following description, the matters defined in the description are provided to assist a comprehensive understanding of the present invention, and it is obvious to those of ordinary skill in the art that predetermined modifications or changes of the matters described herein can be made without departing from the scope of the invention. The same reference numbers are used throughout the drawings to refer to the same or like parts. Further, detailed descriptions of well-known functions and structures incorporated herein may be omitted to avoid obscuring the subject matter of the present invention.

Figure 1:
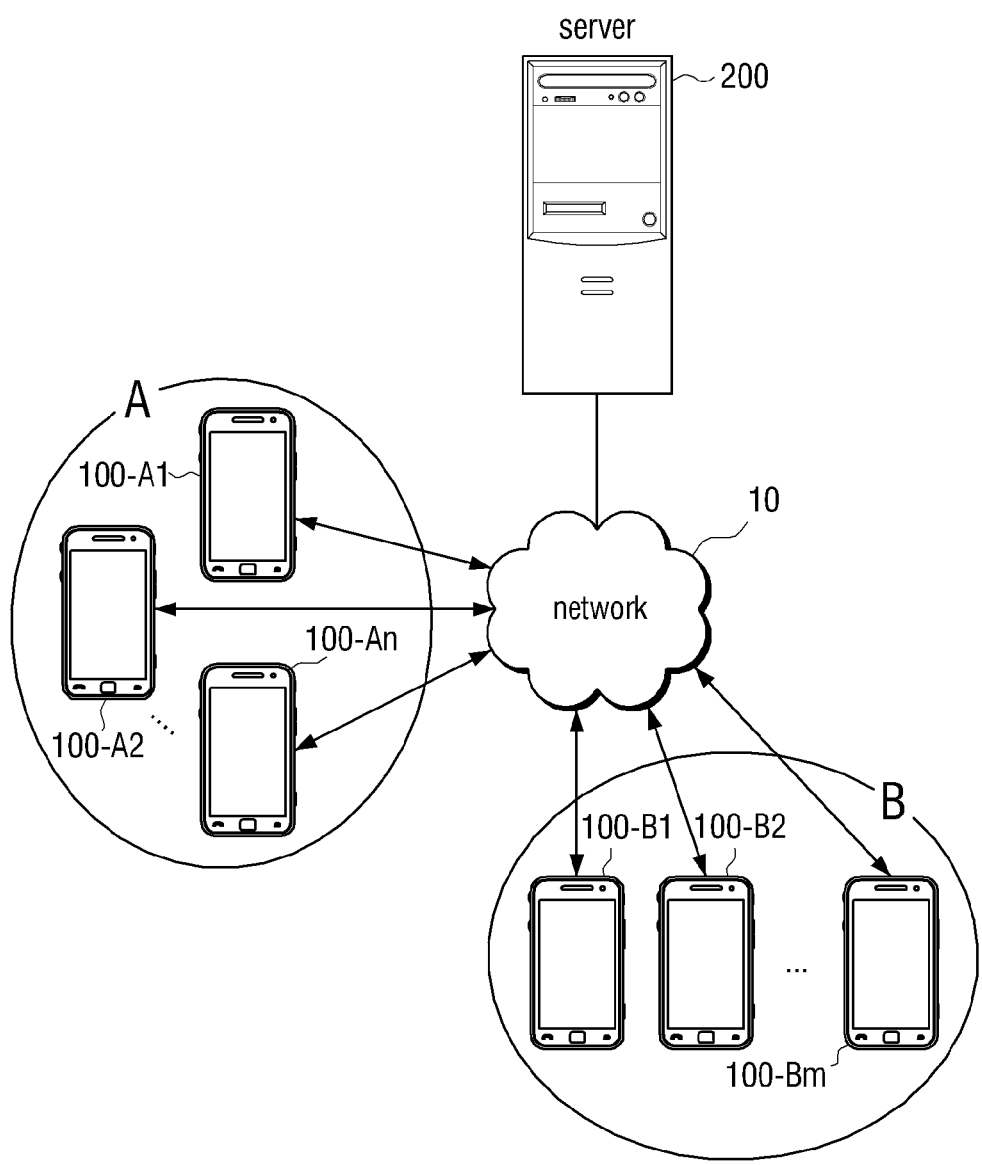
FIG. 1 illustrates a network system according to an embodiment of the present invention.

FIG. 1 illustrates a network system according to an embodiment of the present invention.

Referring to FIG. 1, a network system includes a plurality of user terminal devices 100-A1 through 100-An and 100-B1 through 100-Bm, a network 10, and a server 200. For example, the network 10 can be implemented using a general communication network or a wired/wireless Internet network.

The user terminal devices are classified based on an organization of the user. That is, the user terminal devices are classified as the user terminal devices 100-A1 through 100-An belonging to an organization A, and the user terminal devices 100-B1 through 100-Bm belonging to an organization B. Further, the server 200 offers an adaptive application program for the user terminal devices belonging to the corresponding organization.

For example, a provider for operating the server 200 can enter into a contract with and receive a service request from a representative of the organization. Hence, the provider registers a service hub for the corresponding organization and configures an adaptive service hub program for the organization. The service hub program indicates a program provided and installed to the user terminal devices belonging to the organization in order to easily download, update, and manage one or more application programs set in the user terminal device for the corresponding organization.

When the organization A requests the service in FIG. 1, the server 200 receives various information, such as a list of users belonging to the organization A and user terminal devices of the users, and registers the service hub based on the information. The service hub program may be generated, for example, by altering detailed setup items such as a webpage skin, a menu, and an available application program setup, while sustaining a basic platform, or by newly designing an entire platform according to the request of the corresponding organization.

When the user terminal devices 100-A1 through 100-An of organization A access the server 200, the server 200 transmits the service hub program corresponding to organization A to the user terminal devices 100-A1 through 100-An.

Authentication can be performed before the service hub program is transmitted, using various well-known manners.

For example, the user terminal device can transmit, to the server 200, user information (e.g., an IDentification (ID) and password) and unique information of the user terminal device (e.g., International Mobile Equipment Identity (IMEI), Mobile Station International Subscriber Directory Number (MSISDN), etc.). The user information can also be provided to the server 200 from an operator of the organization.

After receiving the user information and the unique information of the user terminal devices, the server 200 authenticates each user terminal device by comparing the received information with the information provided from the corresponding organization in advance. When completing authentication for a user terminal device, the server 200 transmits the service hub program to the user terminal device.

When the user terminal device downloads and installs the service hub program, an icon container is generated and displayed in a screen of the user terminal device. The icon container corresponds to the service hub, i.e., the service hub program. In addition, the service hub program itself may be referred to as a hub container.

After downloading and installing, when the user selects the icon container, a screen of the user terminal device displays icons of the application programs for the organization or the group (department, rank, gender, age, etc.) of the corresponding user in the organization. The corresponding application programs may be downloaded from the server 200 all together or selectively.

Additionally, a user terminal device may contain preloaded versions of the service hub program used by a corresponding organization and the application programs to be used by the service hub program may be sold to the corresponding organization. For example, in this case, the service hub program and the application programs may be installed already at the point of the release of the user terminal device.

Accordingly, the users of the organization A can collectively use various application programs to be used in the organization A by executing the service hub program provided from the server 200. Further, when there is an old version of a program, the program may be easily updated by the server 200.

When organization B does not make a separate contract with the server 200, the user terminal devices 100-B1 through 100-Bm of the organization B cannot receive the service hub program.

Additionally, the server 200 may limit the service use according to a location change or a state change of a user terminal device. That is, when the location of the user terminal device leaves an effective area, the availability of the service hub program installed to the user terminal device or at least one of the application programs provided for the service hub program and the user terminal device can be restricted.

A method for restricting the availability can be implemented in many different ways. For example, without intervention of the server 200, a user terminal device itself can determine whether or not to use the service hub program by obtaining and comparing its location information with effective area information. For the program determined as unavailable, the user terminal device can delete the corresponding icon displayed, or display the icon in the deactivated state. Alternatively, as normally displaying the icon, the user terminal device can display an error message while performing no operation when the icon is selected. The effective area information can be provided from the server 200, a plurality of effective areas can be defined, or the effective area information can be changed.

Alternatively, the server 200 can directly restrict the availability of the service hub program by comparing a location of the user terminal device and the effective area. That is, the server 200 can receive location information periodically, or in every case of a particular event, (e.g., when the user terminal device transits from a turn-off state to a turn-on state) from the user terminal device. In this case, unique information of the user terminal device can be received together with the location information. Upon locating the user terminal device, the server 200 determines whether the location is within the effective area, and does not take any action when the user terminal device is located within the effective area. However, when the user terminal device is outside the effective area, the server 200 can restrict the availability of the service hub program or at least one application program. More specifically, the server 200 can generate and send a list of unavailable programs to the user terminal device, or send availability information setting the availability or a command instructing to set the unavailable state. Accordingly, the user terminal device disables a particular application program or the service hub program.

As described above, the server 200 can restrict the service use according to the state change of the user terminal device. That is, when the state of the user terminal device or the user changes, e.g., when the user of the user terminal device is no longer a member of the organization, when the user loses the user terminal device, when the user transfers to another department, when the user takes time off, etc., the server 200 can delete the application programs or the service hub program adaptively set for the corresponding organization, or disable the application programs or the service hub program for a specific term.

The state change of the user can be received at the server 200 from the corresponding organization or the user. The server 200 can send a deletion instruction or a suspension instruction according to the received information or request. Accordingly, the corresponding user terminal device can delete or suspend the designated program. In this case, not only the program but also data generated in the execution of the corresponding program can be deleted or suspended.

Additionally, the server 200, which has all of information relating to the user terminal devices of the organization, can support a group service based on that information. That is, the server 200 can support a group mail service so that a group mail (or message) can be transferred between the user terminal devices. For example, when a user terminal device requests a group mail transmission, the server 200 sends the group mail for the service hub or a particular group of the service hub using pre-stored information. More specifically, the user of the user terminal device can send a message for a particular user or group using the user terminal device. The server 200 searches for a transmission target using pre-registered information and then sends a message to the searched target.

Additionally, the server 200 can send a notification message to the each user terminal device included in service hub or a group in the service hub. That is, the server 200 can directly input a message and notify the message to each user terminal device or groups terminal devices within the organization.

Further, the server 200 provides an organization address book of the organization, thereby supporting a service for users to inquire about other users, i.e., receive other users' information, in the organization/group. When a user of the user terminal device selects an address book check service using the user terminal device, the user terminal device requests a user list or detailed information of the service hub from the server 200. According to the request, the server 200 sends the address book including phone numbers or e-mail information.

Figure 2:
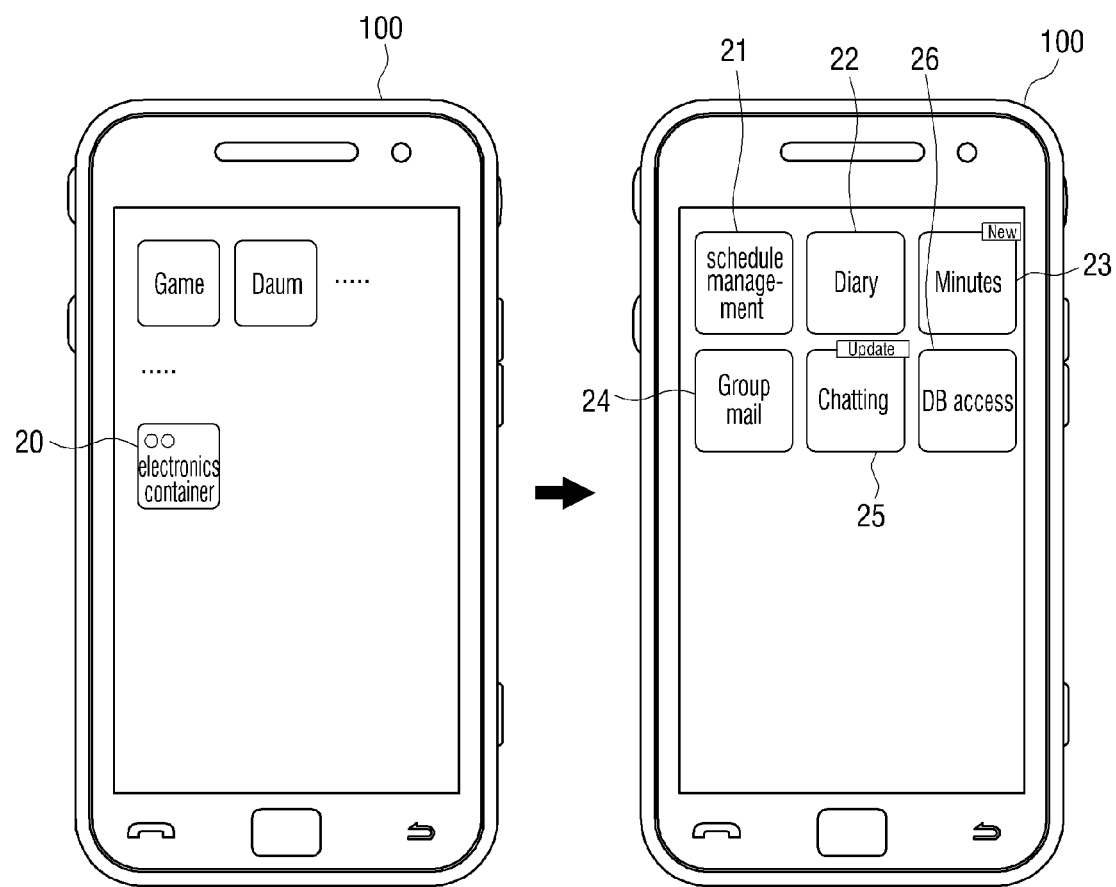
FIG. 2 illustrates a screen configuration of a user terminal device according to an embodiment of the present invention.

FIG. 2 illustrates a screen configuration of a user terminal device according to an embodiment of the present invention.

Referring to FIG. 2, a screen of a user terminal device 100 having a service hub program installed therein displays an icon container 20. The icon container 20, which is generated in accordance with the service hub program, includes icons of the application programs for the corresponding user terminal device 100 and the corresponding service hub program. For example, when the user selects the icon container 20, icons 21 through 26 included in the corresponding icon container 20 are displayed in the screen. While FIG. 2 illustrates six icons within the icon container 20, obviously, the number of the icons is not limited to six.

In FIG. 2, "New" and "Update" are displayed in icons 23 and 25, indicating that the Minutes application of icon 23 is newly installed and that there is an update available for the Chatting application of icon 25. As such, when an icon is displayed, its display state can differ according to the state of the application program corresponding to the icon. In addition to New" and "Update", other appropriate indicators may be used. For example, when an application program of the latest version is normally installed, a word such as "Normal" or "No change" may be displayed in one side of the corresponding icon. Alternatively, display states can be indicated without words, e.g., an abnormal state can be informed by flickering the icon or by changing a color, a location, a size, or a shape of the icon.

Figure 3:
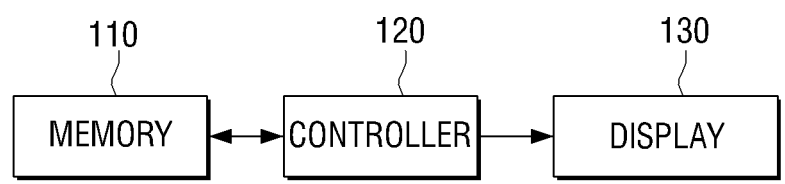
FIGS. 3 through 8 are block diagrams illustrating a user terminal device according to various embodiments of the present invention.

FIG. 3 is a block diagram illustrating a user terminal device according to an embodiment of the present invention. For example, the user terminal device of FIG. 3 can be one of the user terminal devices 100-A1 through 100-An and 100-B1 through 100-Bm in the system illustrated in FIG. 1, and implemented using various terminal devices such as mobile terminals like smart phones, Personal Digital Assistants (PDAs), electronic notebooks, MP3 players, and Personal Computers (PCs). Further, the user terminal device is not necessarily limited the portable terminal devices, and may be implemented using various terminal devices such as Televisions (TVs), and digital photo frames.

Referring to FIG. 3, the user terminal device includes a memory 110, a controller 120, and a display 130. The memory 110 stores a service hub program and application programs available in the user terminal device 100, and the display 130 displays an icon container generated according to an installation of the service hub program. When the displayed icon container is selected, the controller 120 controls the display 130 to display the icons of the application programs, e.g., as illustrated in FIG. 2.

The controller 120 can collectively or selectively download at least one application program from the server 200 by executing the service hub program stored to the memory 110. The service hub program can be initially installed to in the memory 110, or downloaded from the server 200 and installed later.

Figure 4:
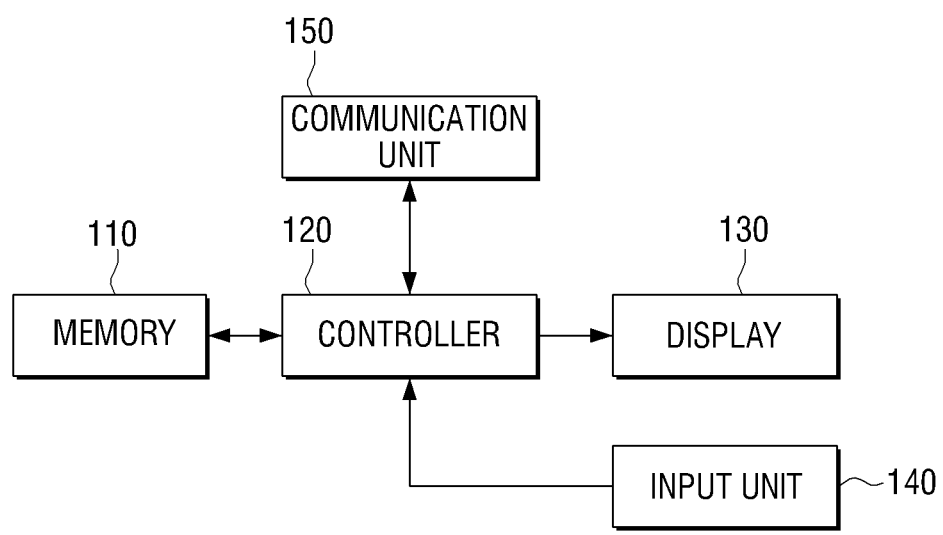

FIG. 4 is a block diagram of a user terminal device according to an embodiment of the present invention. Specifically, FIG. 4 illustrates a user terminal device for downloading a service hub program from a server 200.

Referring to FIG. 4, the user terminal device includes the memory 110, the controller 120, the display 130, an input unit 140, and a communication unit 150. The communication unit 150 accesses the server 200 and downloads the service hub program and the application programs.

The input unit 140 is used to input information or commands. For example, the input unit 140 can be implemented using a touch screen integrally formed with the display 130, or using separate keypad.

When user information is input through the input unit 140, in order to authenticate the user terminal device, the controller 120 sends the user information and unique information of the user terminal device to the server 200 via the communication unit 150. When the authentication is accomplished, the controller 120 downloads the service hub program from the server 200 and installs it in the memory 110. Thereafter, the controller 120 can generate and control the display 130 to display an icon container corresponding to the service hub program, as described above regarding FIG. 3.

Additionally, the controller 120 may receive information regarding the application programs from the server 200, by executing the service hub program. That is, the controller 120 may download the application programs, a list of the application programs, or a list of the icons, via the communication unit 105. For example, when the service hub program is installed and executed, the controller 120 transmits various information, such as user information, unique information, and identification information of the service hub program, to the server 200, via the communication unit 150. Thereafter, the controller 120 receives a list of the application programs corresponding to the service hub program and a list of the icons of the application programs from the server 200.

Using the list of the icons, the controller 120 generates an icon container including icons for the application programs, and the icons for the application programs, and provide them to the display 130.

The list of the application programs includes the application programs designated for the organization and the group of the user of the user terminal device.

For example, when the service hub program is initially executed, the controller 120 receives the list of the application programs, downloads the application programs of the list from the server 200, and installs the programs in the memory 110.

Alternatively, even when a plurality of application programs to update or to newly install are registered for the service hub, the application programs or the update data can be downloaded all together. In this case, the execution screen of the service hub program displays a menu requesting the collective download or the collective update. When the user selects the collective download or the collective update, the corresponding operation is performed.

For example, the controller 120 checks the state of the existing application programs currently downloaded or installed on the user terminal device in order to determine whether the application programs include an application to update or install. Upon determining the application program to update or install, the controller 120 controls the display 130 to change the display state of the icon according to the state of the corresponding application program, as illustrated above in FIG. 2.

Accordingly, when an icon corresponding to an application program not installed is selected among the displayed icons, e.g., indicated as "New", the controller 120 downloads the corresponding application program from the server 200 and installs it to the memory 110.

Further, when the icon corresponding to the application program of the old version is selected among the displayed icons, e.g., indicated as "Update", the controller 120 may update the application program of the old version installed in the memory 110 by downloading a newer version or update data for the application program of the old version from the server 200.

Additionally, the controller 120 can be implemented such that the application program provided for the user terminal device is confirmed only by selecting the icon container displayed in the screen. That is, the user terminal device also offers a function, such as "Menu", with which the user can confirm and select various functions. When the user selects the function "Menu", all of the functions of the user terminal device can be displayed as a menu tree.

Although not illustrated in FIGS. 3 and 4, a user terminal device can further include a location calculation unit for calculating its location information. The location calculation unit may calculate the location information using Global Positioning Satellite (GPS) information or utilize location information obtained over a 3G network. Alternatively, the location calculation unit may calculate the location information using a geomagnetic sensor of the user terminal device.

When the location of the user terminal device is known and the service hub program is initially executed, the controller 120 can register the location of the user terminal device by transmitting the current location information to the server 200. Thus, based on the registered location for the user terminal device, the server 200 can control whether to provide the service hub program and the application program to the user terminal device.

Figure 5:
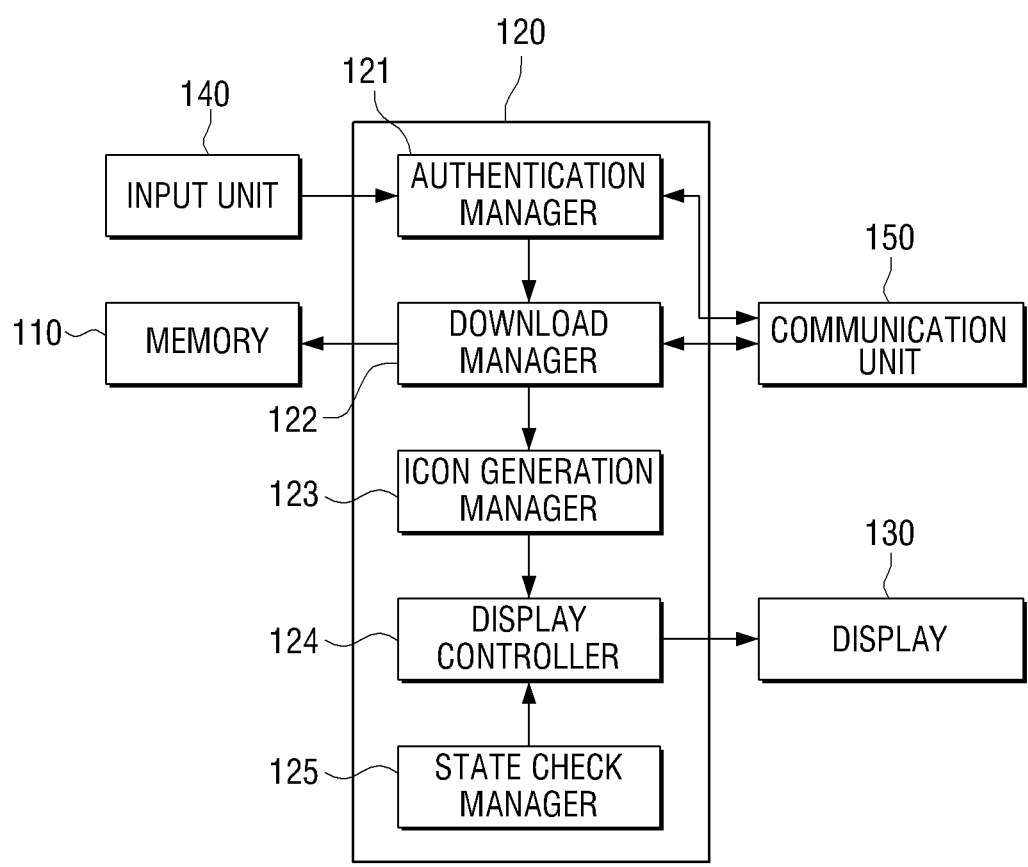

FIG. 5 is a block diagram illustrating a user terminal device according to an embodiment of the present invention. More specifically, FIG. 5 illustrates a controller 120 according to an embodiment of the present invention.

Referring to FIG. 5, the controller 120 includes an authentication manager 121, a download manager 122, an icon generation manager 123, a display controller 124, and a state check manager 125. The authentication manager 121 performs an authentication process with the server 200 by sending various information such as unique information, user information, and location information of the user terminal device, to the server 200. Thereafter, the server 200 certifies whether the corresponding user, i.e., the user terminal device, is authorized to download the service hub program by checking the received information, determines whether the download is possible, and transmits the authentication result to the authentication manager 121 via the communication unit 150. According to the authentication result, the authentication manager 121 determines whether to download the service hub program.

When the authentication manager 121 determines to download the service hub program, the download manager 122 sends a transmission request for the service hub program to the server 200 via the communication unit 150, and then receives the service hub program from the server 200.

When the service hub program is received, installed, and executed at the user terminal device, the download manager 122 can request information of the application programs by transmitting various information, as described above, for specifying the user terminal device, to the server 200.

After authenticating the user terminal device, the server 200 sends a list of the application programs corresponding to the user terminal device and the service hub program, and a list of icons for the application programs, to the download manager 122.

The download manager 122 can protect the downloaded application program against the access from other programs, such as menu or file manager. That is, the user may not be able to access the application program provided by the service hub through functions such as the menu function or the file search function, and can access only through the service hub program. Accordingly, the download manager 122 can hide the above-mentioned application programs by preventing them from being displayed in the menu tree and excluding them from the search target in the search.

The download manager 122 is operated in the same way as a secure folder manager in the above description; however, a secure folder manager may be provided separately, irrespective of the operation of downloading. That is, the secure folder manager can secure information such as an application list and an icon received from the server 200, such that it is not exposed to outside. For example, such information may be stored in a hidden state.

In addition, a user may set or release a separate password for each application received through a service hub program. That is, a secure folder manager may add and display a separate menu for selecting a password setting function and a password releasing function in a service hub program menu. If a user selects the menu, an area for setting or releasing a password with respect to various applications is displayed. The user may set a password by inputting the password in an area corresponding to a desired application or may release a password setting of a desired application by selecting a password releasing button.

If a user selects an application encrypted with a password, a User Interface (UI) for requesting an input of the password is displayed on a screen. The user may use the corresponding application only when the password is accurately input on the UI. As such, security may be further strengthened as a password is set for each application.

A password may be set or released with respect to all of the applications or use of a service hub program instead of each application. That is, if a user selects an icon container, a UI for requesting an input of a password may be displayed on a screen. If a user inputs the password accurately, information regarding various applications corresponding to the relevant service hub program may be displayed. In addition, a password may be set or released by group. That is, a plurality of applications may be classified into groups and a password may be set or released with respect to each group.

Further, a route or a method to access an application received via a service hub program as described above may be unified. That is, applications may be configured such that operations such as icon display, application execution, application removal, etc., are only performed through a service hub program. In this case, a user may check information regarding applications received via a service hub program and select whether to execute an operation when an icon container is selected on a screen.

As described above, a service hub program may perform various processing to maintain security of various information received via the service hub program.

The icon generation manger 123 downloads icon data from the server 200 based on the received icon list. Thereafter, the icon generation manger 123 generates the icon container or the icon by managing the icon data. That is, the icon generation manger 123 generates the icon container including the icons for the application programs according to the received icon list.

The display controller 124 controls the display 130 to display the icon container in the screen. Therefore, when the icon container is selected, the display controller 124 controls the display 130 to display the icons of the icon container.

The state check manager 125 changes the display state of each icon in the icon container according to the current installation state of the application program of the first list. Accordingly, the user can easily confirm the state of the application program provided in the service hub. When the user selects the icon, the processing corresponding to the icon state is performed.

Figure 6:
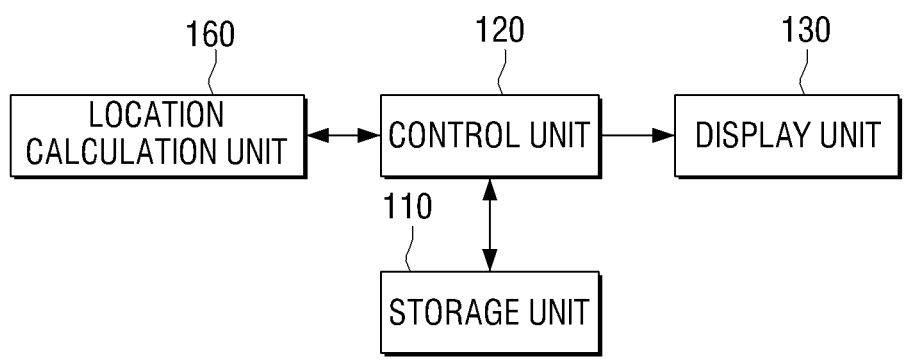
Figure 7:
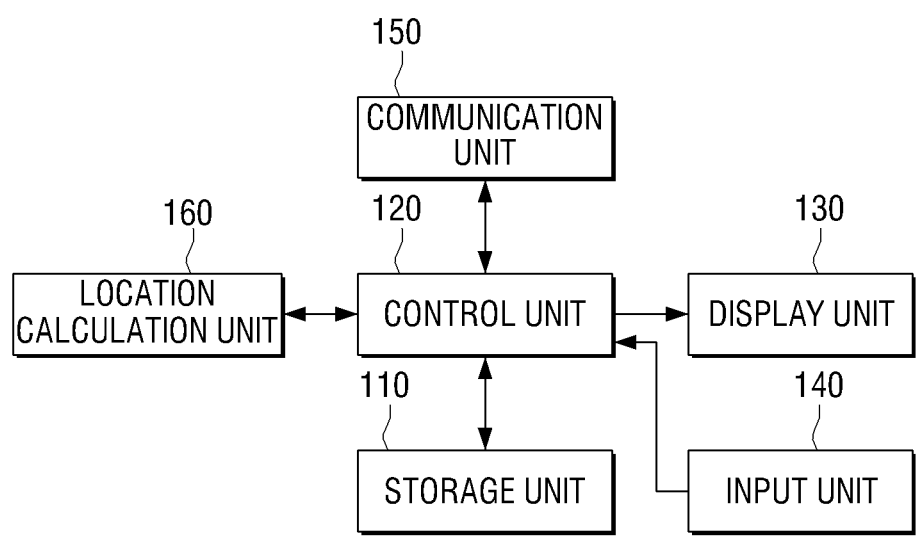

FIGS. 6 and 7 are block diagrams illustrating user terminal devices for providing a Location Based Service (LBS) according to embodiments of the present invention. Specifically, the LBS limits the availability for the service hub program or at least one of the application programs corresponding to the service hub program according to the location of the user terminal device.

Referring to FIG. 6, the user terminal device 100 includes a memory 110, a controller 120, a display 130, and a location calculation unit 160. The memory 110, the controller 120, and the display 130 operate as described above in the embodiments illustrated in FIGS. 3, 4 and 5.

The location calculation unit 160 calculates a location information of the user terminal device. As described above, the location information can be calculated using GPS information, location information obtained from the 3G network, location coordinates calculated by a geomagnetic sensor module of the user terminal device, etc.

The controller 120 supports the LBS, based on the location information and the effective area information. That is, according to whether the location information falls outside of the effective area information, the availability of at least one of the application programs or the service hub program is limited, the authentication result is adjusted, or the location is registered. The LBS can be executed when the service hub operates only in a specific region requested by the corresponding organization, i.e., only in the effective area.

For example, when the location of the user terminal device is in the effective area, the controller 120 displays the icon container corresponding to the service hub program by normally executing the service hub program. Accordingly, when the corresponding icon container is selected, the controller 120 displays the icons of the icon container in the screen.

However, when the location of the user terminal device leaves the effective area, the controller 120 disables the service hub program or at least one application program. That is, when the service hub program is disabled, the controller 120 can delete the icon container from the screen or display the icon container as being in an unselectable state. Alternatively, even when the icon is selected, the controller 120 can merely restrict the icon display.

When the application program is disabled, the controller 120 can delete or display the icon in the unselectable state by disabling all or part of the application programs for the corresponding service hub.

The effective area information can be frequently set or changed in a webpage provided from the server 200, and a plurality of the effective areas can be set.

The authentication and/or the use of only a particular application program of the multiple application programs may be restricted according to the location information. In this case, for the plurality of the effective areas as stated above, the authentication and/or the use of the different application program may be restricted per effective area. For example, when the application programs for the service hub are a1, a2, a3, b1, b2, c1, and c2, only a1, a2, and a3 can be used in the area A, only b1 and b2 can be used in the area B, and only c1 and c2 can be used in the area C.

The operations of the controller 120 based on the location information may be performed by the user terminal device itself, or controlled with the intervention of the server 200.

When the user terminal device itself provides the LBS, and when the service hub program is executed, the user terminal device receives the effective area information from the server 200. The effective area information may be received every time the service hub program is executed, when the effective area is changed after one reception in the initial execution, or on the periodic basis.

The controller 120 checks whether the user terminal device is located in the effective area by comparing the effective area information received from the server 200 with the location information. Therefore, when the user terminal device is in the effective area, the controller 120 supports the normal use of the service hub program and the application program, as described above. However, when the user terminal device is located outside of the effective area, the controller 120 limits the availability of the application program or the service hub program. That is, when a program is running, the controller 120 automatically terminates the execution of the corresponding program. Thereafter, when an execution request for the program of the limited availability is received, the controller 120 ignores the execution request. When the availability is limited, the display state of the icon container or the icon can be displayed in the inactivated state as aforementioned. In this case, when the available application program exists, the activated icon of the application program can be retained.

When the server 200 provides the LBS, the user terminal device can transmit its location information to the server 200 periodically or every time a particular event takes place. After receiving the location information, the server 200 determines whether the service is supportable by comparing the effective area information set by the organization with the location information. Thereafter, the server 200 transmits availability information so that the user terminal device can limit the availability according to the information, if necessary.

The availability information can set the application programs and the service hub program to the available state when the location of the user terminal device is located in the effective area, and set at least one of application programs and the service hub program to the unavailable state, when the location of the user terminal device is outside of the effective area. Further, the availability information can be in a list of the unavailable application programs including information relating to the forbidden application program outside the effective area among the application programs provided for the corresponding service hub.

The controller 120 limits the availability of the application programs of the list. Additionally, when all of the application programs are unavailable, the controller 120 may limit the availability of the service hub program itself.

The controller 120 may control the display 130 to display the icon or the icon container for the unavailable application program of the application programs, in an inactivated state.

As described above, when the service hub program is initially executed, the controller 120 sends and registers various information to the server 200. Using the received location information, the server 200 checks whether the corresponding user terminal device is located in the effective area. When the user terminal device is located in the effective area, the server 200 can transmit the service hub program or the application program. However, the authentication fails when the user terminal device is located outside of the effective area.

Further, the server 200 can consider time. That is, the server 200 may register the corresponding user terminal device only when the service hub program is executed during a preset time period, e.g., starting from the service hub registration, or the conclusion or validation of the contract with the organization.

Referring to FIG. 7, a user terminal device includes a memory 110, a controller 120, a display 130, an input unit 140, a communication unit 150, and a location calculation unit 160. As described in relation to FIG. 4, the communication unit 150 communicates with server 120 and can transmit and receive programs and data. The input unit 140 can receive various information and/or commands from the user. Because the components illustrated in FIG. 7, except for the location calculation unit 160, are the same as those illustrated in FIG. 4, and operations of the components are the same as the components illustrated in FIG. 4, a repetitive description of these components are omitted.

Figure 8:
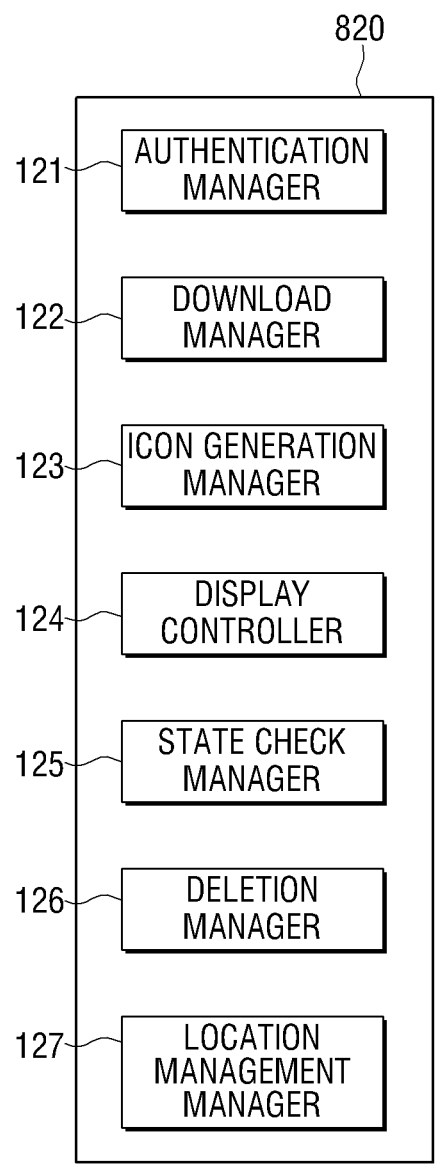

FIG. 8 is a block diagram illustrating a user terminal device according to an embodiment of the present invention. More specifically, FIG. 8 illustrates a controller 820 of a user terminal device according to an embodiment of the present invention.

Referring to FIG. 8, the controller 820 of the user terminal device includes an authentication manager 121, a download manager 122, an icon generation manager 123, a display controller 124, a state check manager 125, a deletion manager 126, and a location management manager 127. The components of the controller 120 in FIG. 8, excluding the deletion manager 126 and the location management manager 127, are the same as those illustrated in the controller 120 of FIG. 5, and therefore, their descriptions shall be omitted.

The location management manager 127 provides the above-described LBS. In an alternative embodiment, the location management manager 127 of FIG. 8 may be deleted, or equipped and used together with the deletion manager 126 as illustrated in FIG. 8.

The deletion manager 126 can delete or disable the service hub program, at least one application program, and data according to the state change of the user or the user terminal device. For example, the deletion manager 126 can receive a list of programs to delete from the server 200 and then delete the application programs from the list application programs. The deletion manager 126 can request the list of the programs to delete to the server 200 every time the service hub program is executed, or can periodically receive the list of the programs to delete from the server 200 using a separate daemon program for checking whether to delete the program. The list of the programs to delete can be generated based on the application list provided from the user terminal device. That is, the deletion manager 126 sends the list of the applications installed in the user terminal device and the unique information and the user information to the server 200. The server 200 selects the application program to delete from the list of the applications installed in the user terminal device, and then sends the list to the user terminal device. Hence, the deletion manager 126 can delete the application program in the list.

Alternatively, the deletion manager 126 may transmit the terminal unique information or the user information to the server 200, and receive and delete the list of the application program to delete as determined from the server 200. For example, the deletion manager 126 may delete every application program corresponding to the service hub or the service hub program according to an instruction from the server 200. That is, a wipe-out can be requested from the server 200, when the state changes and may to jeopardize the security maintenance, e.g., when the user resigns or does not belong to the organization anymore, or when the user terminal device is lost. For the wipe-out request, the server 200 sends a deletion instruction for the service hub program or a deletion program for the all the application programs to the deletion manager 126. The deletion instruction may be referred to as a wipe-out instruction. The deletion manager 126 can check whether the wipe-out instruction is received from the server 200 every time the service hub program is executed, or may periodically check whether the wipe-out instruction is received, using a separate daemon program.

Upon receiving the wipe-out instruction, the deletion manager 126 deletes every program and data. Additionally, the deletion manager 126 may delete the icon container and/or the icon display.

As described above, the deletion manager 126 may perform a kill function for individually deleting the application programs, or a wipe-out function for deleting all of the application programs or the service hub program and the data all together. The kill function and the wipe-out function can be applied separately or together. That is, the deletion manager 126 may include a kill manager for conducting the kill function and a wipe-out manager for conducting the wipe-out function. Accordingly, the security for the service can be maintained definitely.

While the kill function and the wipe-out function may be performed according to the request of the organization or the user for the server 200, they can also be performed based on location or the authentication failure of the user terminal device. That is, the kill or wipe-out function can be executed also when the user terminal device leaves an effective area over a preset time or fails the authentication. As a result, it is possible to present an unauthorized third party from using the hub service.

The operations of the deletion manager 126, i.e., the kill function and the wipe-out function can also be executed by the controller 120 as illustrated in FIG. 7, wherein the controller 120 receives a list of the application programs to delete or the wipe-out instruction from the server 200 via the communication unit 150. Hence, the program or the data stored to the memory 110 can be deleted.

Figure 9:
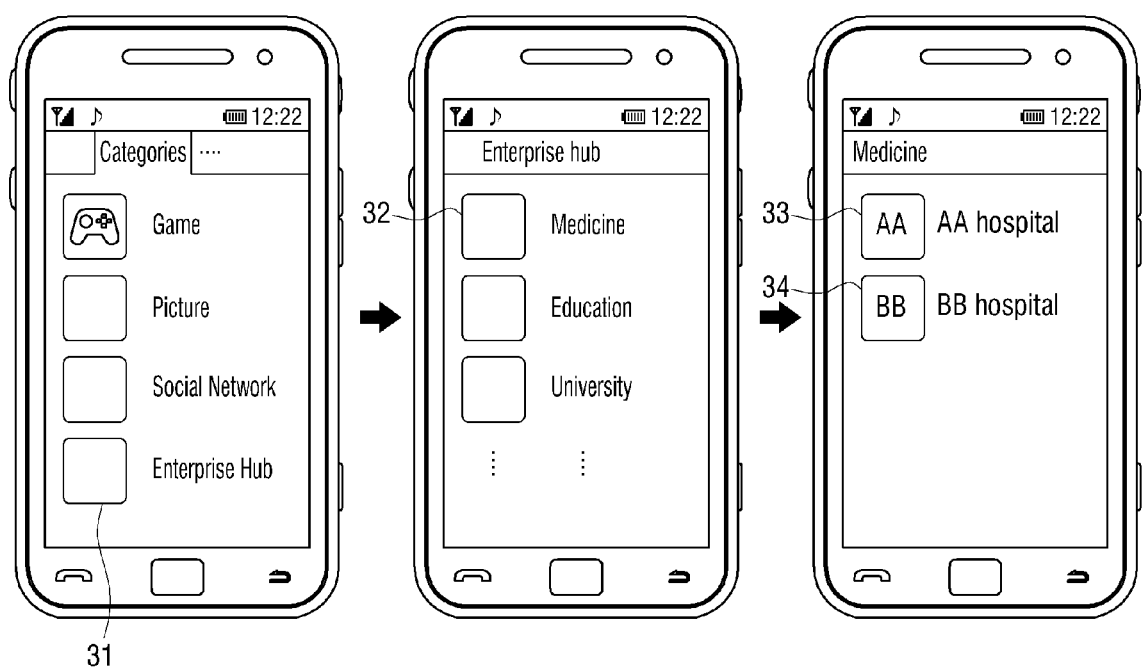
FIGS. 9 and 10 illustrate a method for downloading and installing a service hub program in a user terminal device according to an embodiment of the present invention.
Figure 10:
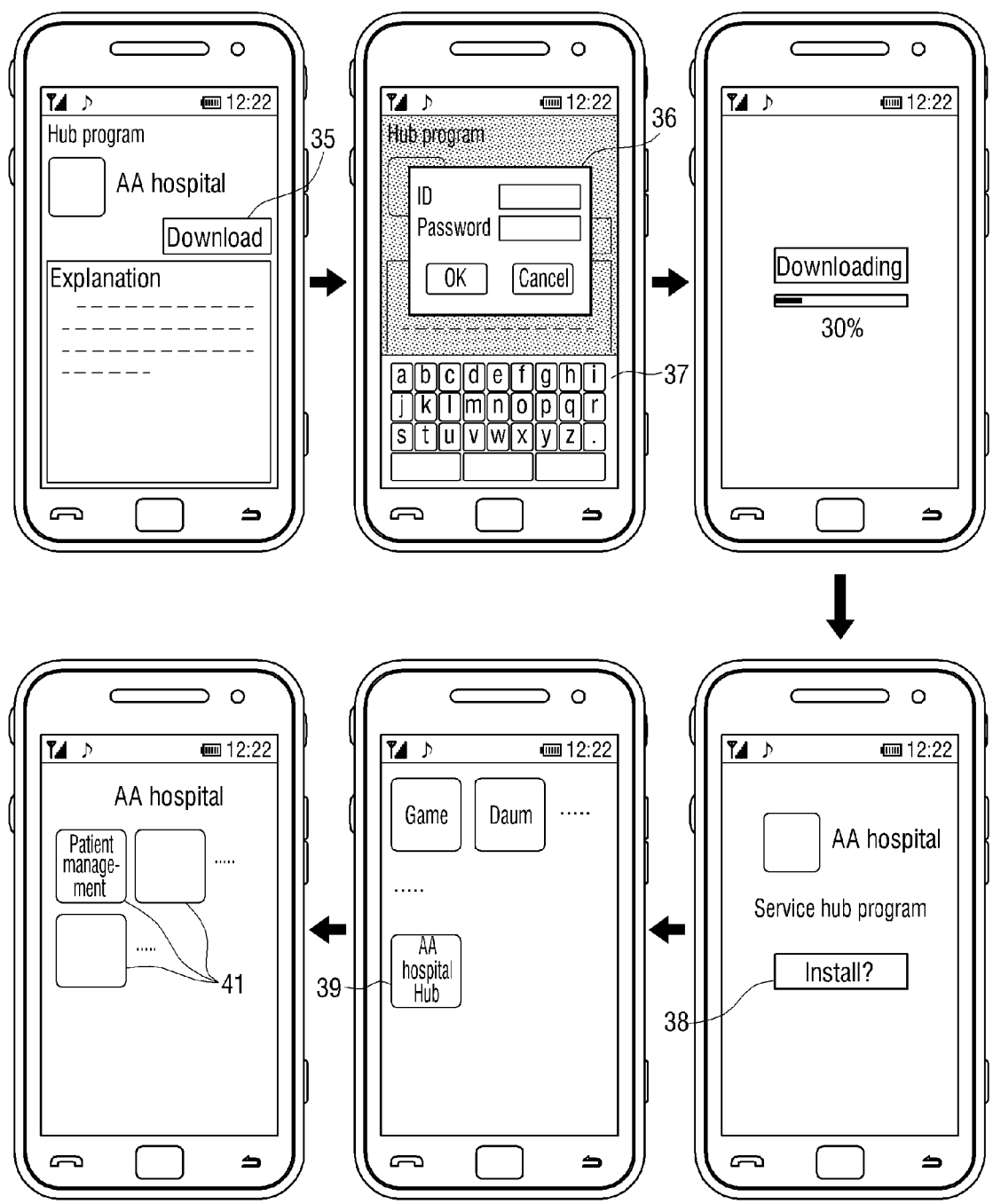

FIGS. 9 and 10 illustrate a method for downloading and installing a service hub program in a user terminal device according to an embodiment of the present invention.

Referring to FIG. 9, when the user terminal device accesses the server, e.g., an application store, the user terminal device displays categories for the application programs. When the user selects a menu 31 "Enterprise Hub", supporting the hub service, the user terminal device is connected to the server 200, which provides the hub service.

Using page data provided from the server 200, the user terminal device displays groups for distinguishing the organizations of which the service hub is registered. For example, in FIG. 9, the user terminal device displays the groups including "Medicine", "Education", "University", etc.

When group 32 is selected, information 33 and 34 relating to the organization of the registered service hub among the organizations belonging to the group 32, are displayed. That is, in the "Medicine" field, an AA hospital and a BB hospital, which have contracted with the server 200 to receive the hub service, are displayed for the user selects his/her organization.

When the user is a worker of the AA hospital and selects an AA hospital menu 33, the user terminal device displays a screen 30 downloading the service hub program for the AA hospital, as illustrated in the first image of FIG. 10. Specifically, the user obtains information of the service hub program, and requests the download by selecting a download menu 35.

After the download menu 35 is selected, the user terminal device displays a pop-up window 36 for inputting the user information. For example, an input window 36 and a keypad 37 can be displayed together with the pop-up window, as illustrated in FIG. 10. Alternatively, the user may input an ID and password in person using a touch pen on the pop-up window 36. This user information can be provided from the server 200 for the organization after the contract between the server 200 and the organization, or directly designated by an operator of the organization. The operator of the organization can notify the server 200 of the users belonging to the organization of the user information in via mail, email, a text message, a webpage, etc., or in person.

When the user information is input, the user terminal device performs authentication by transmitting the user information and unique information of the user terminal device to the server 200. When the authentication is successful, the download of the service hub program is initiated. For example, as illustrated in FIG. 10, during the download, a message indicating the downloading degree can be displayed on the user terminal device, and when the download is completed, the user terminal device can displays a message inquiring about whether to install the service hub program. When the user selects a menu 38 "Install", the service hub program is installed to the user terminal device and the user terminal device displays an icon container 39.

When the icon container 39 is selected, all of icons 41 in the icon container 39 are displayed. As described above, the display state of the icons 41 can be altered according to installation state and version information of the application program.

Figure 11:
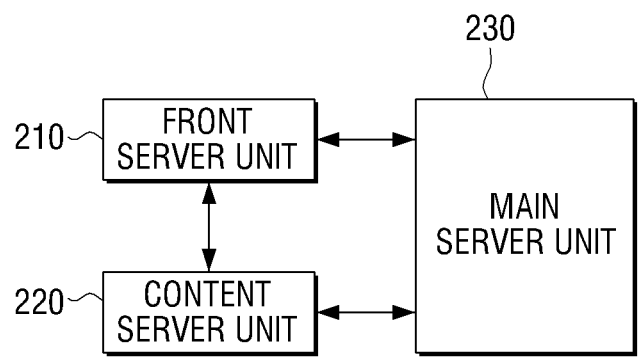
FIGS. 11 and 12 are block diagrams illustrating a server according to various embodiments of the present invention.

FIG. 11 is a block diagram illustrating a server according to an embodiment of the present invention.

Referring to FIG. 11, the server includes a front server unit 210, a content server unit 220, and a main server unit 230. The content server unit 220 stores the service hub program and the application programs. The front server unit 210 manages authority of the application program for providing the service per enterprise and per business, and performs preprocessing functions such as initialization, authentication, and policy execution and management. The front server 210 routes the service to the content server unit 220 according to the service type, based on the contract. That is, when the user terminal device is connected, the front server unit 210 determines whether the user terminal device is pre-registered, and then provides the adaptive service hub program and the application programs to the user terminal device.

When the authentication is successful, i.e., the user terminal device is pre-registered, the main server unit 230 controls the front server unit 210 to transmit the service hub program corresponding to the user terminal device and the application programs corresponding to the service hub program and the user terminal device, from among the service hub programs and the application programs stored in the content server unit 220, to the user terminal device.

The setup of application programs can be performed by the main server unit 230. That is, the administrator of the server 200 or the organization operator who accesses with a server account assigned by the server 200 can access the main server unit 230, request generation of the service hub, and set the application programs.

The main server unit 230 generates the service hub when the service is requested, and sets the service hub program and the application program corresponding to the service hub. The main server unit 230 may allocate the server account to the organization which requests the service, and provide a server capacity so that the organization operator accessing with the server account directly can set and manage the service hub program and the application program. Alternatively, the main server unit 230 can adaptively generate the service hub program for the organization based on the information provided from the organization, and directly set the application programs to be provided to the users of the organization.

When the user terminal device receives the location information at the initial execution of the service hub program, the main server unit 230 can set the service hub program to be used in the user terminal device and the application program to be managed by the corresponding service hub program, using the location information and other unique information. That is, in the initial execution at the location of the organization A, the main server unit 230 can set the service hub program and the application program corresponding to the organization A.

Additionally, when load occurs in a particular user party, the main server unit 230 can establish a policy for limiting the access of the user terminal device belonging to the user party. Herein, the user party can be the organization itself of the user, or the group of the user in the organization. The group can be divided to the departments or the divisions of the organization structure, and may be divided based on other criteria, e.g., based on various criteria such as position, gender, age, marital status, blood type, etc. The main server unit 230 can limit the access based on other reasons than the load. That is, when the contract from a particular organization is not complied with, the service suspension is requested, or the organization is dissolved, the main server unit 230 can establish the policy for limiting the access for the user terminal device registered to the corresponding organization. When the user terminal device registered in the user party of the limited access attempts the access, the front server unit 210 ignores the attempt and does not allow the access according to various policies established by the main server unit 230.

When the load occurs in a particular service, the main server unit 230 may establish a policy for limiting the corresponding service. That is, when application programs for providing a group mail service and a train ticket reservation service are excessively executed and subject to the overload, the main server unit 230 can control not to execute the application programs supporting the corresponding services though they are selected, or does not support the server operation in association with the application programs. According to the service restriction policy established by the main server unit 230, the front server unit 210 can limit the service for each user terminal device.

Additionally, when the location of the user terminal device leaves the effective area, the main server unit 230 can disable the service hub program for the user terminal device or at least one application program for the service hub program. That is, the main server unit 230 can provide the LBS. According to the setup state of the main server unit 230, the front server unit 210 can generate the unavailable list or the availability information, and send it to the user terminal device.

When the state of the user terminal device changes, the main server unit 230 can set the kill function for deleting at least one of the application programs provided to the user terminal device, or the wipe-out function for deleting at least one of every application program provided to the user terminal device, the service hub program, and the data generated in every program execution all together. According to the set function, the front server unit 210 can send the kill instruction or the wipe-out instruction to the user terminal device 100. The state change can be received from the operator of the organization or the user online or offline. Such state changes can include a personal state change such as a job change, retirement, transfer, time-off of the user, etc., and the state change such as loss, breakdown, or replacement of the device.

The main server unit 230 can support various functions per service hub. For example, the main server unit 230 can calculate the service usage on the particular user basis and provide information of the service usage. That is, the information of the service usage can be provided directly to the user terminal device via the front server unit 210, or the main server unit 230 can provide the information of the service usage directly to the terminal of the organization operator. The information of the service usage can be information relating to the current download state, the frequency of use, the use time, and the use cycle of the service hub program or the application program per organization, i.e., per enterprise, per service group, or per user. The main server unit 230 defines various events as the indicator for obtaining the service usage. For example, the main server unit 230 can define the events such as download, execution, and execution end. In the service operation, the main server unit 230 detects the event occurrence according to the definition. Accordingly, the main server unit 230 calculates the information of the service usage by analyzing event logs, database, and server logs. Accordingly, the service usage and the task progress per user and per organization in the organization can be easily monitored in view of the administrator.

For example, the main server unit 230 can also support the group mail service. When the operator of the organization, the administrator of the server, or the user terminal device generates and requests to send group mail by designating a particular user party, the main server unit 230 can set to transmit messages to the user terminal devices corresponding to the corresponding user party using the pre-registered user information. The front server unit 210 transmits the corresponding group mail to the user terminal device set by the main server unit 230.

In addition, even when a notification message is generated, the main server unit 230 can set to send the notification message to the user terminal devices having the reception entitlement for the notification message. Accordingly, the front server unit 210 can send the notification message.

Figure 12:
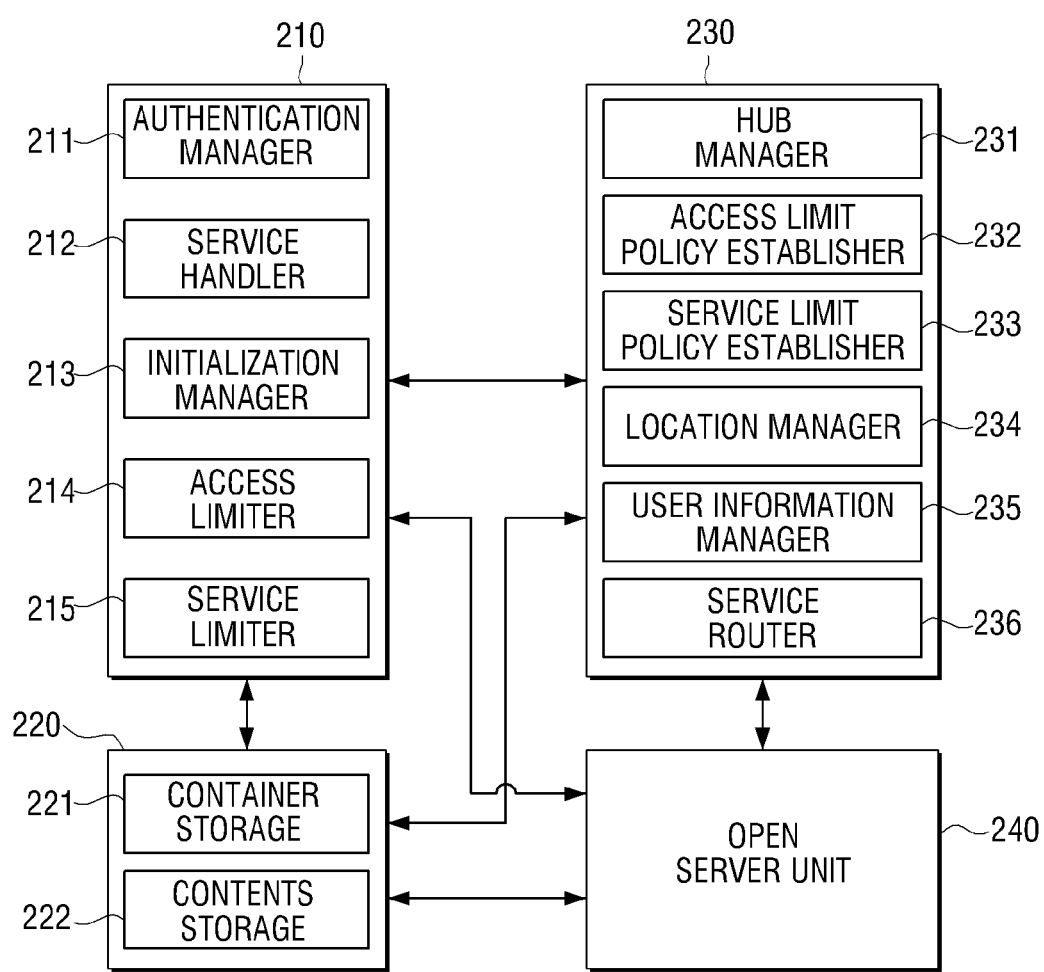

FIG. 12 is a detailed block diagram illustrating a server according to another embodiment of the present invention.

Referring to FIG. 12, the server includes a front server unit 210, a contents server unit 220, a main server unit 230, and an open server unit 240. The front server unit 210 includes an authentication manager 211, a service handler 212, an initialization manager 213, an access limiter 214, and a service limiter 215.

The authentication manager 211 performs the authentication by receiving the unique information of the device and the user information from the user terminal device. More specifically, the authentication manager 211 performs authentication by decoding and restoring the received information, comparing the information with the information provided from the organization, and determining whether the corresponding device is the device registered by the organization which requests the hub service. Therefore, when determining the registered device, the authentication manager 211 sends the authentication result to the user terminal device 100. While the authentication manager 211 can inquire the main server unit 230 about the information provided from the organization, the authentication manager 211 may fulfill the authentication by using the information stored to the open server unit 240 to reduce the load of the main server unit 230.

The service handler 212 manages the various services provided to the user terminal device. The service handler 212 can divides the service between different devices according to the type of the hub service. More specifically, when receiving the transmission request from the user terminal device that receives the authentication result, the service handler 212 transmits the service hub program corresponding to the user terminal device. The service hub program is adaptively generated for the service hub of the registered user terminal device. The service hub program can partially change some functions of the program, the webpage skin, and the available application programs in accordance with the nature of the organization, and other program basic structures can be the same.

More specifically, when the user terminal device accesses and is authenticated by the authentication manager 211, the service handler 212 routes the service hub program and the application program corresponding to the user terminal device from the contents server unit 220 to the user terminal device.

The initialization manager 213 performs the initialization when the service hub program is initially executed to access the user terminal device. That is, at the initial access of the user terminal device, the initialization manager 213 generates the application list and the icon list using the information registered to the open server unit 240 or the main server unit 230, and registers the terminal unique information, such as IMEI, received from the user terminal device, to the open server unit 240 or the main server unit 230.

When the name or the organization of the user changes or when the service hub changes, the open server unit 240 may detect this change using information of its open hub manager (not shown) and open user manager (not shown), and thus, re-register the user information or the terminal unique information. Through the initialization manager 213, the user can obtain the exact authority in real time regardless of the company or region and easily acquire the list of the services to receive. The terminal unique information, can be automatically registered to the server 200.

As for the user terminal device initially accessing, the initialization manager 213 can store the unique information of the terminal not exposed to the user by mapping the unique information and the user information, and provide the container list of the corresponding service hub based on basic data of the open server unit 240 synchronized with the main server unit 230.

When receiving the check request for the application program download or update, the service handler 212 generates the list of the application programs to newly download or to update and send the generated list to the user terminal device. Accordingly, upon receiving the download request or the update request for at least one application program of the list, the service handler 212 transmits the requested application program or update data to the user terminal device.

According to an embodiment of the present invention, the service handler 212 may transmit the application programs of the application program list all at once, or when receiving the download request or the update request for at least one of the application programs of the application program list, the service handler 212 may transmit the at least one application program or the update data to the user terminal device.

It is not necessary that the application program list and icon list are generated by the initialization manager 213, and alternatively, the service handler 212 or the main server 230 can generate the application program list and icon list.

When at least one of various source information, such as user terminal device, organization, group, and application program setup state, changes, the application program list and icon list can be regenerated according to the change.

When a particular user party suffers from the load, the access limiter 214 limits the access of the user terminal device belonging to the user party. That is, when an error occurs during the hub service, the access limiter 214 can control and manage the service support on the organization basis, that is, on the enterprise basis or on the group basis. That is, an access limit policy establisher 232 of the main server unit 230 can make and execute an access limit policy by registering the service hub to control. When the access limit policy is executed, the access limiter 214 restricts the access of the user terminal corresponding to the control target according to the policy. Using the access limit policy, the overload or the error in the service of a particular enterprise can be addressed in real time, thus promptly preventing the error from spreading to other services. Accordingly, the use can be limited per organization or per group.

The front server unit 210 can include the service limiter 215 for limiting the service when the load occurs in a service limit specific service.

According to the service limit policy established by a service limit policy establisher 233 of the main server unit 230, when limiting the access of the system for the contents server unit 220, the service limiter 215 restricts the access and blocks the service. Hence, the use can be limited per particular service.

The content server unit 220 includes a container storage 221 and a content storage 222. The container storage 221 stores the service hub program corresponding to the hub service or the icon container information relating to the service hub program. The content storage 222 stores the application programs corresponding to the respective service hub programs and other content. The content can be classified into various categories based on their attributes.

For example, the content can be divided into common content, such as a financial application and a personnel matter application, indicating general content commonly used regardless of fields, industry content indicating content managed per specific industry field such as hospital, school, and enterprise, and special content indicating content developed and used for a particular enterprise. For example, the content can be divided and stored based on the fields such as electronics, chemistry, hospital, and school.

The content storage 222 stores a segment group list and content of the corresponding organization using a hub ID allocated to a service hub newly registered. Accordingly, when the user terminal device accesses the server, the content storage 222 can provide the stored content.

Although not illustrated in FIG. 12, the content server unit 220 may include a content generation manager, a service group and user manager, an authentication manager, etc. Accordingly, before providing the content, the content server unit 220 generates and provides the content corresponding to the user after the authentication. The list for providing the content can be provided from the front server unit 210 or the main server unit 230, and the content server unit 220 may generate the list using the user information by itself and provide the corresponding program.

The open server unit 240 independently manages the information for fast authentication per enterprise or per business. When the front server unit 210 requests various information for authentication, the open server unit 240 can provide basic information using an open hub manager (not shown) and an open user manager (not shown). The various information stored in the open server unit 240 can be synchronized with various data recorded to the main server unit 230, various data stored to the content server unit 220, and various data received via the front server unit 210.

More specifically, the open server unit 240 stores backup information of at least one of the unique information of the user terminal device, the user information of the user terminal device, the service hub program information provided for the user terminal device, and the application program information for the service hub program, and provides the backup information as sharing information. That is, when the main server unit 230 manages all of the information, the front server unit 210 requests the information from the main server unit 230 at each authentication. The main server unit 230 is subject to the load. Therefore, the open server unit 240 manages the backup information and provides the information when the authentication is conducted.

When the user terminal device initially receives the user information input by the user or the unique information of the terminal device, the open server unit 240 provides basic information for generating the icon container. In addition, the open server unit 240 can provide and share the enterprise information and the user information to and with an authorized external institution. An external institution such as application developer, can expose necessary information to develop applications required for the organizations, using open Application Programming Interface (API). Because the open server unit 240 can support the external institution to easily develop the applications, enhancement of the application program can be activated.

The main server unit 230 includes a hub manager 231, the access limit policy establisher 232, a service limit policy establisher 233, a location manager 234, a user information manager 235, and a service router 236. The hub manger 231 registers the service hub when the service is requested. The hub manager 231 may allocate the server account when an organization requesting the service intends to directly manage the service hub. That is, when the organization requesting the service is in a certain scale, the organization may have human resource capable of managing the service hub. In this case, the server account can be requested on the contract with the administrator of the server. Therefore, the operator of the organization can access its server account by inputting an ID and password in the webpage supported by the server. Thus, the operator can directly set the application program to use in the service hub of the organization, modify, add, and delete the information of the user or the user terminal device registered to the service hub, and set or utilize various services such as LBS, group mail service, and notification message service.

When the server account is allocated to the organization operator, a login page is displayed to the operator. That is, a page data for providing the login page to the operator of the organization is transmitted.

When the operator inputs identification information allocated to the organization in the login page, second page data for providing a management page adaptively generated for the organization is transmitted.

While the management page can be provided by the server administrator in the beginning, the organization operator can modify and edit the management page some time later. The management page displays various information. For example, the management page can provide a region for reading the list of the available application programs of the organization, a region for adding, modifying, and deleting the application program, a region for reading member information registered for the organization, a region for adding, modifying, and deleting the member information, a region for classifying the members, a region for selecting the application program to be used by the classified member group, etc.

The login page and the management page of a similar type can be provided to the organization operator and also to the server administrator. That is, in the contract with a small or medium-sized enterprise or an individual having insufficient human resources, the administrator of the server can manage the service hub according to the request. In this case, the hub manager 231 can provide the same management page even when the administrator of the server logs on.

The access limit policy establisher 232 makes the policy for limiting the access per organization or per group, and the service limit policy establisher 233 makes the policy for limiting the use per service. According to the policies established by the access limit policy establisher 232 and the service limit policy establisher 233, the access limiter 214 and the service limiter 215 of the front server unit 210 restrict the access and the service use of the terminal device.

The location manager 234 supports the location registration and the LBS. When the service hub program is initially executed in the user terminal device, the location manager 234 receives and registers the location information. Accordingly, the location information is referred to when the corresponding terminal device is authenticated or when the corresponding service hub program and application program are set.

When the location of the user terminal device leaves the effective area, the location manager 234 disables the service hub program or at least one application program for the service hub program with respect to the user terminal device. Herein, the effective area and the application program to be disabled can be changed by the request of the organization operator or the server administrator, or by the change of the user information. A plurality of effective areas can be defined, and different programs can be disabled in each effective area, as described above.

The user information manager 235 manages the information of the user or the user terminal device registered to the service hub. Specifically, the user information manager 235 can set the kill function and the wipe-out function according to the state change of the user terminal device or the user.

More specifically, the user information manager 235 can periodically check whether the state changes, based on the user information frequently or periodically transmitted from the administrator of the server or the operator of the organization, or based on the information transmitted from the user terminal device itself. Accordingly, when the state changes, the user information manager 235 sets the corresponding function and the front server unit 210 takes the corresponding action.

The service muter 236 mutes the service to adequately provide the user terminal device with the adaptive service hub program and application program for the user terminal device. Specifically, when the authentication manager 211 of the front server unit 210 performs the authentication and the service handler 212 routes the user information, the service router 236 sets the suitable service hub program and application programs. Accordingly, the service handler 212 can generate and send the list to the user terminal device.

As described above, the components of the server provide the service hub. In FIG. 12, the disposition of the components is divided for ease of understanding, not to limit the disposition. That is, the server illustrated in FIG. 12 may be explained with other components including an interface unit, a memory, and a controller. For example, the controller can process all or part of the functions of the front server unit 210, the main server unit 230, and the contents server unit 220.

FIGS. 13 through 19 illustrate screens for registering and managing a service hub according to embodiments of the present invention.

Referring to FIG. 13, when a user accesses a webpage of a server through a terminal, e.g., a PC, a login screen 50 is displayed. That is, the server transmits page data for generating the login page to the corresponding terminal.

When the user inputs an ID and password, the screen changes to a management page listing menus 51 through 54 for classifying clients of the supported hub server in one side, a list menu 55 for checking a list of clients (enterprises) currently selected, and an application menu 56 for checking the application programs supported for the client. The menus 51 through 54 include an enterprise menu, a Small and Medium Enterprise (SME) menu, a Small Office/Home Office (SOHO) menu, which are divided based on the organization scale, and an application menu. The user can select one of the menus 51 through 54 and then select the list 55 or the application menu 56.

When the list menu 55 is selected, detailed information such as list, status, nationality, and number of the devices registered, of the clients of the supported hub service is displayed.

FIG. 14 illustrates a screen 60, which is displayed when the application menu 56 of FIG. 13 is selected.

Referring to FIG. 14, the application programs are classified and arranged into categories including Common 61, Industry 60, and Specialized 63. When one category is selected, a list of the application programs of the selected category is arranged. The user can select at least one of the application programs in the list and determine to support the selected application program. The server 200 allocates server space to the organization operator as described above. Accordingly, the user, i.e., operator of the organization, can login by inputting an allocated ID and password in the login page, as illustrated in FIG. 10.

Figure 15:
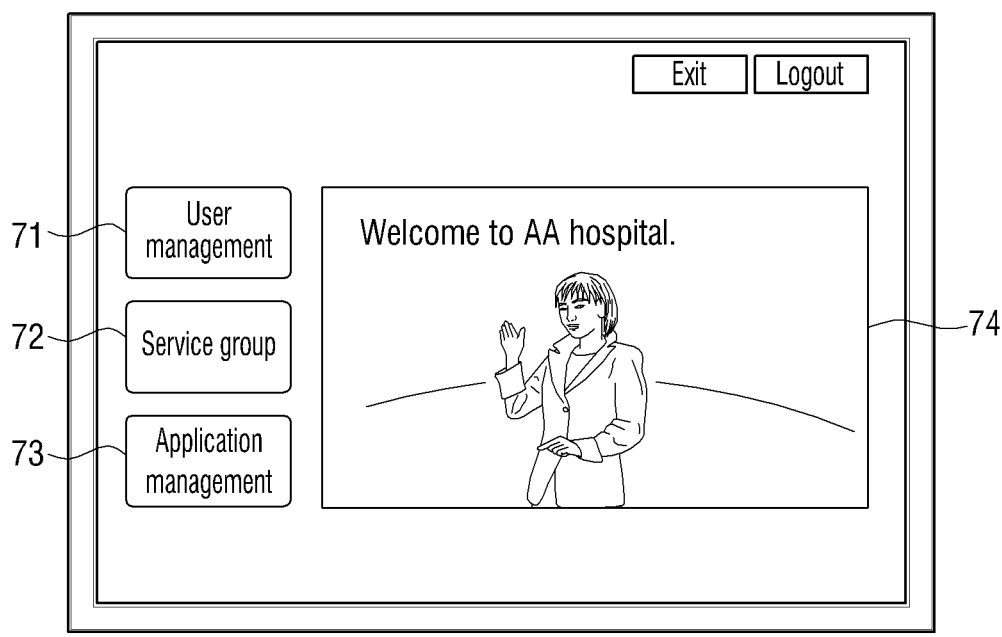

FIG. 15 illustrates a management page individually allocated and provided to an operator of the organization.

Referring to FIG. 15, unlike the management page utilized by the administrator of the server, the management page provided to the organization operator is adaptively generated in the service hub. Specifically, in FIG. 15, menus including user management 71, service group 72, and application management 73 are displayed on a management page. For example, an image adaptively generated in the service hub is displayed in a center area 74 of a screen. The operator of the organization can arbitrarily change the image, and the location and the type of the menus 71, 72 and 73.

FIG. 16 illustrates the management page, after User management 71 is selected.

Referring to FIG. 16, the screen displays information of the users registered to the service hub. While only ID, Name, and Status are illustrated in FIG. 16, other information such as device information usable by each user, position, department, gender, etc., can also be displayed. The operator can select a particular user in the list and obtain detailed information of the user. Thus, the operator can change the status of the user. In this case, when a user resigns, the operator can set the status of the user to the resignation. Accordingly, the server intercepts the service provided to the user terminal device of the corresponding user. That is, the server can send the kill instruction or the wipe-out instruction for deleting the program or the data individually or entirely.

Additionally, when the operator changes the department of the user to another department, the server newly generates the list of the application programs corresponding to the changed department and the relevant icon list, and provides the lists to the user terminal device. In addition, the server sends the kill instruction for the unavailable application programs of the existing application programs. Accordingly, the user terminal device deletes at least one of the existing application programs, and downloads or updates the new application programs.

As illustrated in FIG. 16, the operator can easily modify, add, and delete the user in the list, and the screen can display a menu for sorting based on the status, or for searching.

While the effective area is not illustrated in FIG. 16, the operator can also set the effective area. That is, when a particular user transfers from Seoul to Busan, the effective area can be changed from "Seoul" to "Busan", thereby limiting the service in areas other than Busan.

Figure 17:
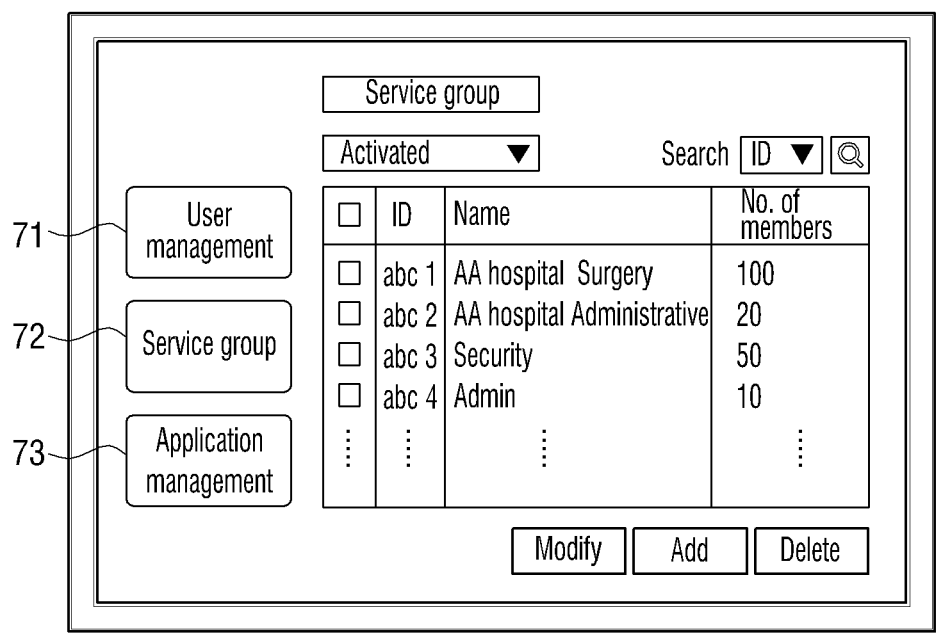

FIG. 17 illustrates a screen that is displayed when the service group 72 is selected.

Referring to FIG. 17, the service group 72 is divided based on the construction of the organization. For example, when the organization is a hospital, as illustrated in FIG. 17, the service group is divided into departments (surgery, administrative, security, etc.). When the operator selects one service group in the list, the information of the users belonging to the corresponding service group and the information of the application programs provided for the service group can be displayed. Therefore, the operator can select the available application programs in the corresponding service group all together. When the user terminal device belonging to the corresponding service group executes the service hub program according to the selection of the operator, the server can download or update the application programs of the service group all together or selectively.

Figure 18:
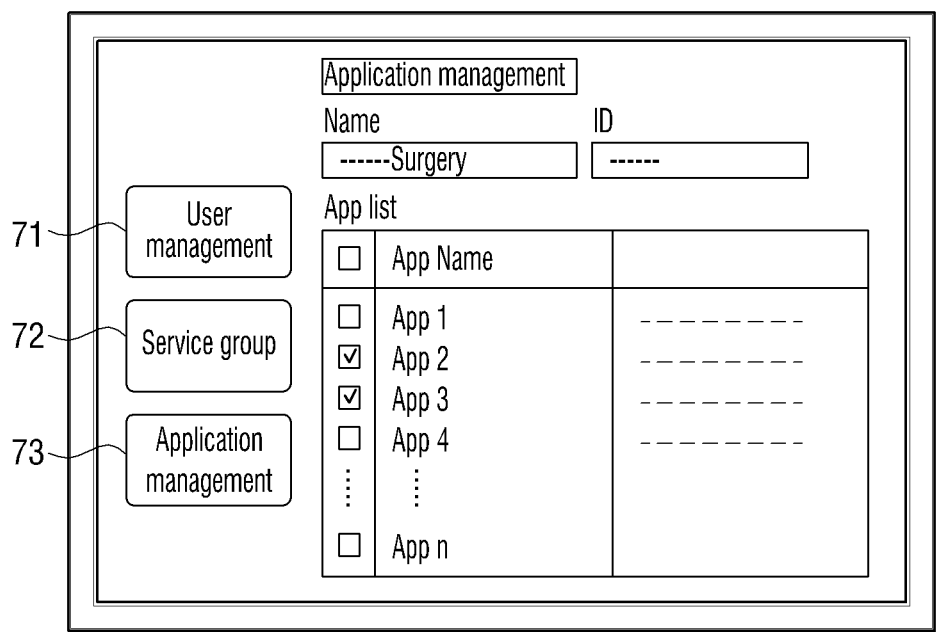

FIG. 18 illustrates an application program management for a particular service group. That is, when a particular service group is selected from the screen illustrated FIG. 17, the screen of FIG. 18 is displayed.

Referring to FIG. 18, a name and an ID of the selected service group are displayed at the top, and information of all application programs including the application program currently supported for the service group is displayed in the list. The operator can determine the application program to support in the service group by changing the selection status for each application program.

FIG. 19 illustrates the screen that is displayed when the application management menu 73 is selected.

Referring to FIG. 19, based on the type of sorting, the application programs, the application programs currently supportable, and the application programs per category can be displayed in the lists. Thereafter, operator can select the application program in the list and obtain the detailed information of the application program.

Figure 20:
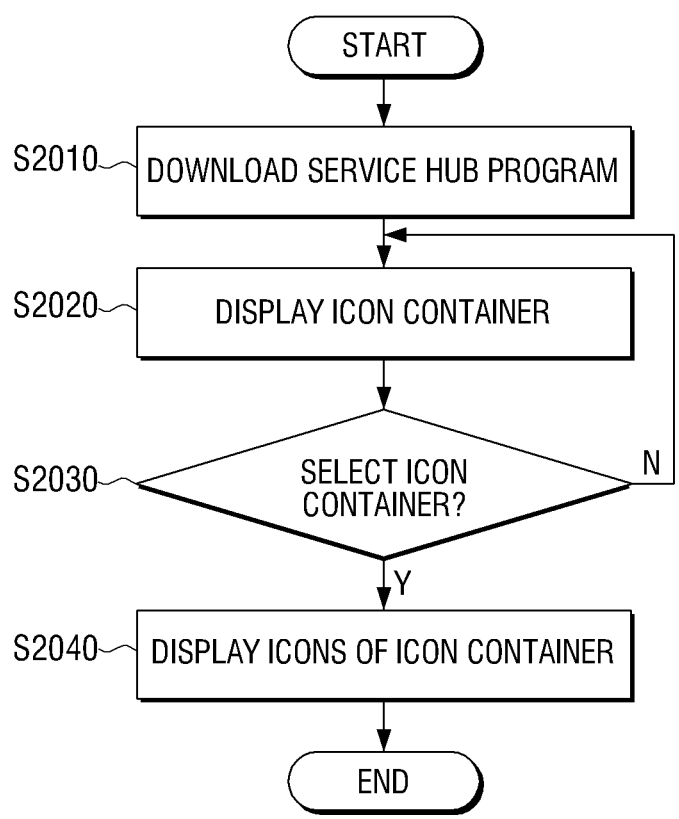
FIG. 20 is a flowchart illustrating a service providing method of a user terminal device according to an embodiment of the present invention.

FIG. 20 is a flowchart illustrating a service providing method of a user terminal device according to an embodiment of the present invention.

Referring to FIG. 20, the user terminal device accessing a server and then downloads a service hub program in step S2010. When accessing the server, the authentication and the location acquisition of the user terminal device can be performed.

In step S2020, the user terminal device installs the downloaded service hub program and then displays an icon container corresponding to the service hub program. When the icon container is selected in step S2030, the application icons included in the icon container are displayed in step S2040.

When an application icon is selected, the user terminal device can execute the application program corresponding to the selected icon, or download or update the corresponding program.

Figure 21:
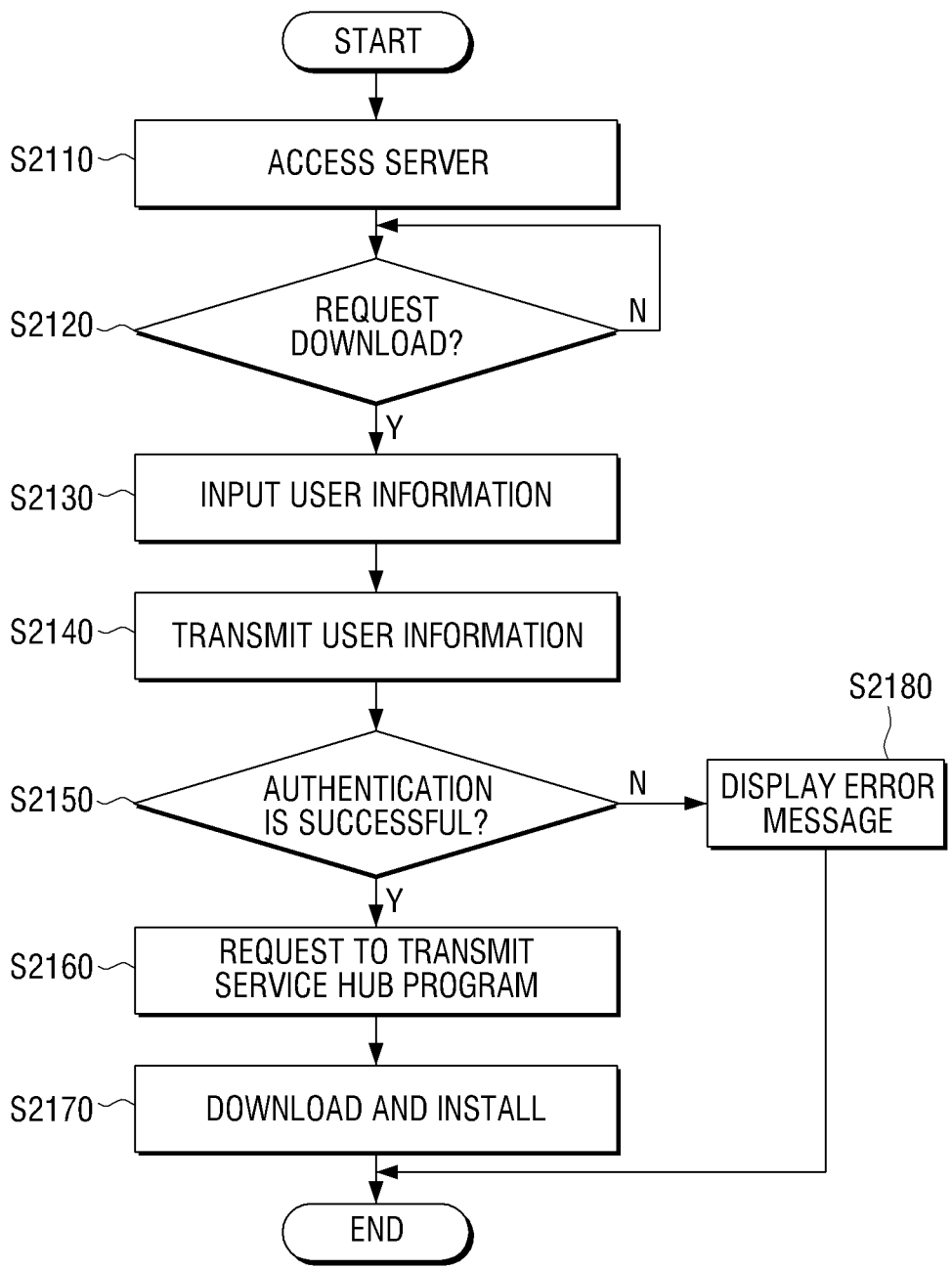
FIG. 21 is a flowchart illustrating a method for installing a service hub program according to an embodiment of the present invention.

FIG. 21 is a flowchart illustrating a method for downloading a service hub program according to an embodiment of the present invention.

Referring to FIG. 21, when accessing the server in step S2110, the user terminal device displays a screen according to page data provided from the server. The user can select the service hub program to download in the screen and requests to download the service hub program in step S2120.

When the download is requested, the user terminal device displays a screen requesting the user information in step S2130 and sends input user information to the server in step S2140. The server performs the authentication using the received user information.

When the authentication is successful in step S2150, the user terminal device sends the service hub program transmission request to the server in step S2160, and downloads and installs the service hub program in step S2170. However, when the authentication is not successful in step S2150, the user terminal device displays an error message in step S2180.

Figure 22:
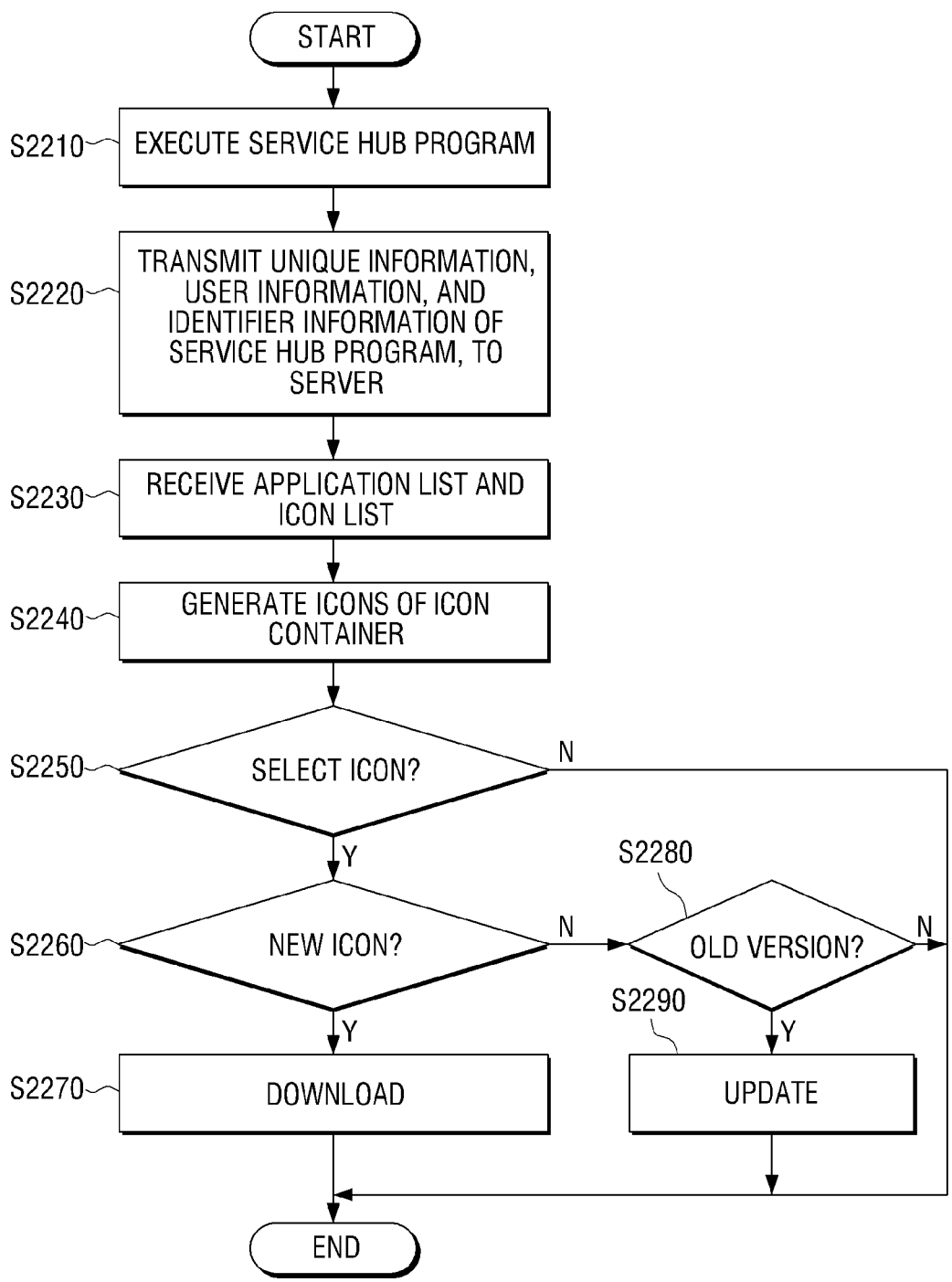
FIG. 22 is a flowchart illustrating a method for processing an application program corresponding to a service hub program according to an embodiment of the present invention.

FIG. 22 is a flowchart illustrating a method for displaying an icon of a user terminal device with an installed service hub program according to an embodiment of the present invention.

Referring to FIG. 22, a service hub program is executed in step S2210, and the user terminal device transmits the unique information, the user information, and the identifier information of the service hub program to the server in step S2220. In step S2230, the user terminal device receives the list of the application programs and the list of the icons.

When the icon container is selected, the user terminal device generates and displays the icons included in the icon container in step S2240. At this time, the user terminal device changes the display status of the icons by checking the installation and the version information of each application program.

When the user selects an icon in step S2250, the user terminal device performs the adaptive process according to the status of the application program corresponding to the selected icon. Specifically, if the status of the selected icon is for a new icon in step S2260, the user terminal device downloads and installs the corresponding application program from the server in step S2270. If the status of the selected icon is not for a new icon, but is for the existing icon of an old version in step S2280, the user terminal device updates the existing application program by requesting the update from the server in step S2290.

If the status of the selected icon is not for a new icon or an old version, i.e., when the application program of the latest version is already installed, the user terminal device immediately executes the application program corresponding to the icon. As described above, the application programs can be downloaded or updated individually or all together.

Figure 23:
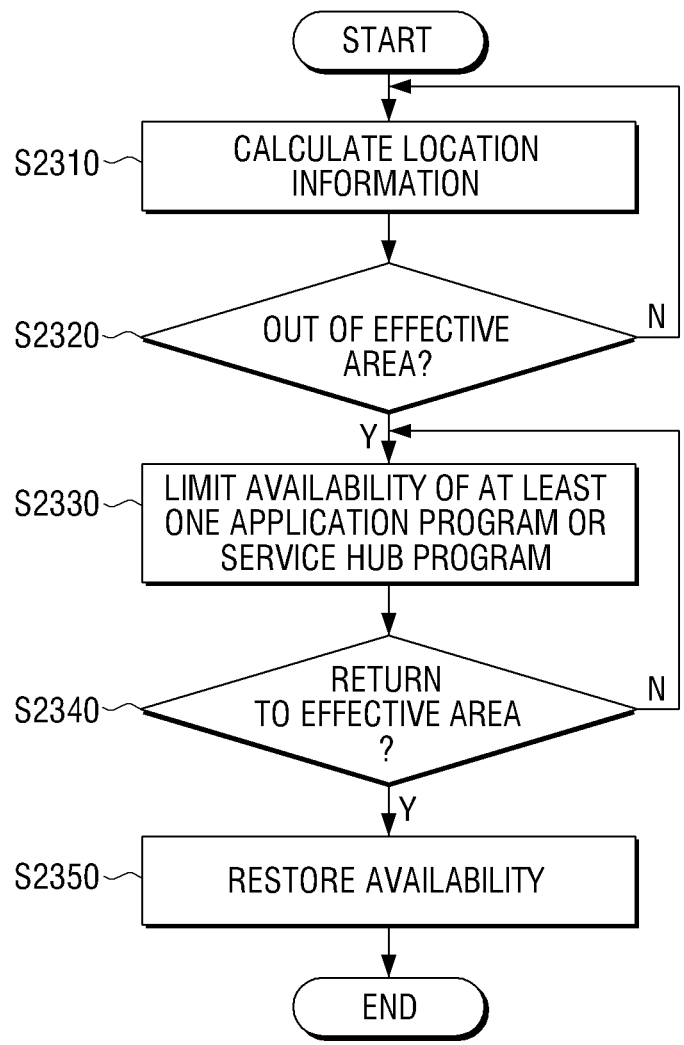
FIG. 23 is a flowchart illustrating a method for limiting program availability according to a location in a user terminal device according to an embodiment of the present invention.

FIG. 23 is a flowchart illustrating a service providing method of a user terminal device for providing an LBS according to an embodiment of the present invention.

Referring to FIG. 23, the user terminal device calculates its location information in step S2310, and based on the location information, in step S2320, it is determined whether the user terminal device leaves an effective area. As described above, the user terminal device receiving the effective area information from the server can directly determine if it leaves the effective area, or the user terminal device may transmit the location information to a server and the server may determine if the user terminal device leaves the effective area by comparing the location information with the registered effective area information.

When determining the effective area secession, i.e., when it is determined that the user terminal device has left the effective area, the availability of at least one application program or the service hub program is limited in step S2330. As described above, the availability can be limited by the server, by receiving the availability information from the server or by receiving the list of the programs to disable, or the user terminal device may disable a particular program by itself by referring to the preset application program information.

When the user terminal device returns to the effective area in step S2340, the availability of the disabled programs is restored to the user terminal device in step S2350. As described above, the restoration can be instructed by the intervention of the server, or determined by the user terminal device itself.

Figure 24:
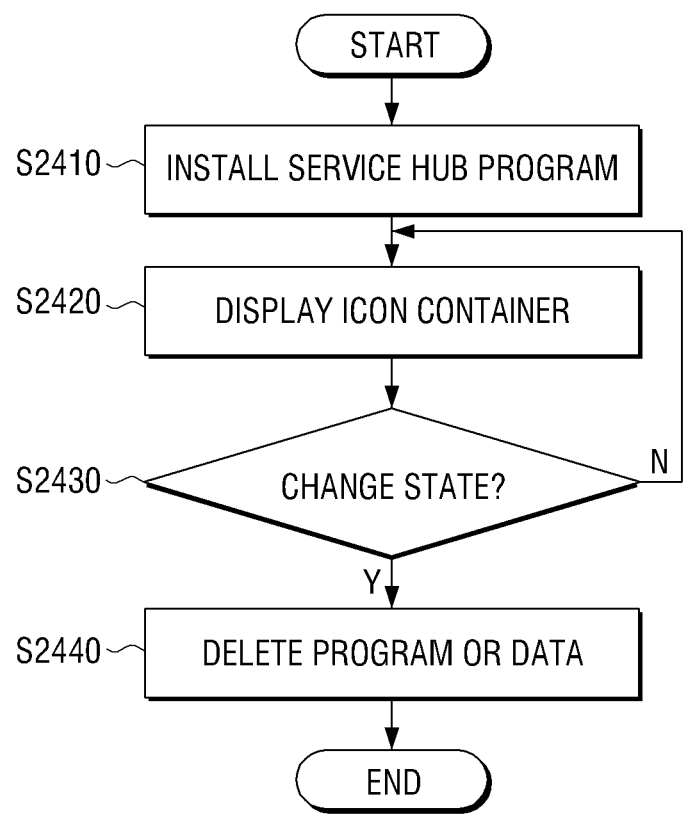
FIG. 24 is a flowchart illustrating a method for deleting a program or data according to state change in a user terminal device according to an embodiment of the present invention.

FIG. 24 is a flowchart illustrating a method for changing a service based on a state change according to an embodiment of the present invention.

Referring to FIG. 24, a service hub program is installed in step S2410, and an icon container is displayed in step S2420. When the state of a user changes in step S2430, the user terminal device can delete at least one of the program and the data in step S2440. In this case, the user terminal device can delete some of the application programs, or delete all of the application programs or the service hub program and the data generating in the program execution all together. This operation can be carried out according to the instruction of the server.

Alternatively, the deletion as illustrated in FIG. 24, it is not necessary, and instead, the program can be processed as being in an unavailable state.

Figure 25:
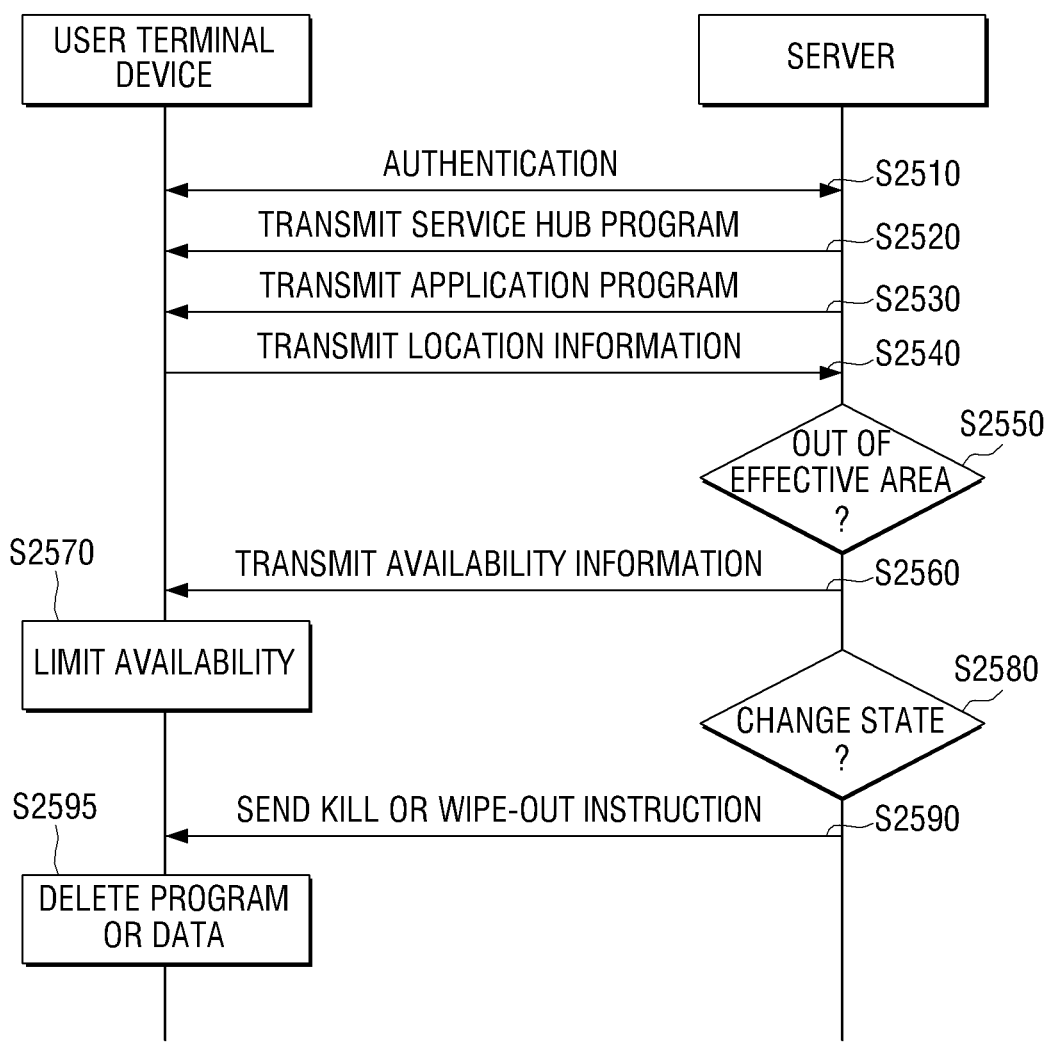
FIG. 25 is a signal flow diagram between a user terminal device and a server according to an embodiment of the present invention.

FIG. 25 is a signal flow diagram for illustrating operations between a user terminal device and a server.

Referring to FIG. 25, after an authentication is conducted between the user terminal device and the server in step S2510, a service hub program is transmitted in step S2520. In step S2530, the application programs are transmitted to the user terminal device, all together or selectively.

When an agreement is made in advance between the organization and the server, and the server and the user terminal device are of the same manufacturer or in a particular contract, the user terminal device sold to the organization may already include the service hub program and the application programs preloaded therein.

As such, when various application programs are installed, the user can use each application program using the service hub program, i.e., using the icon container. As described above, the application program is not hidden such that it is not displayed by a menu or file manager, but is revealed when the icon container is executed.

The user terminal device and the server provide various adaptive services to the service hub. That is, the user terminal device sends location information in step S2540, and based on the location information and the effective area information, the server determines whether the user terminal device leaves the effective area in step S2550. Thereafter, the server sends the availability information to the user terminal device in step S2560.

In step S2570, the user terminal device limits the availability of the programs based on the availability information.

In step S2580, when the state of the user or the user terminal device changes and the service use is to be limited, the server sends the kill instruction or the wipe-out instruction to the user terminal device in step S2590. Thereafter, the user terminal device deletes the program or the data in step S2595.

Figure 26:
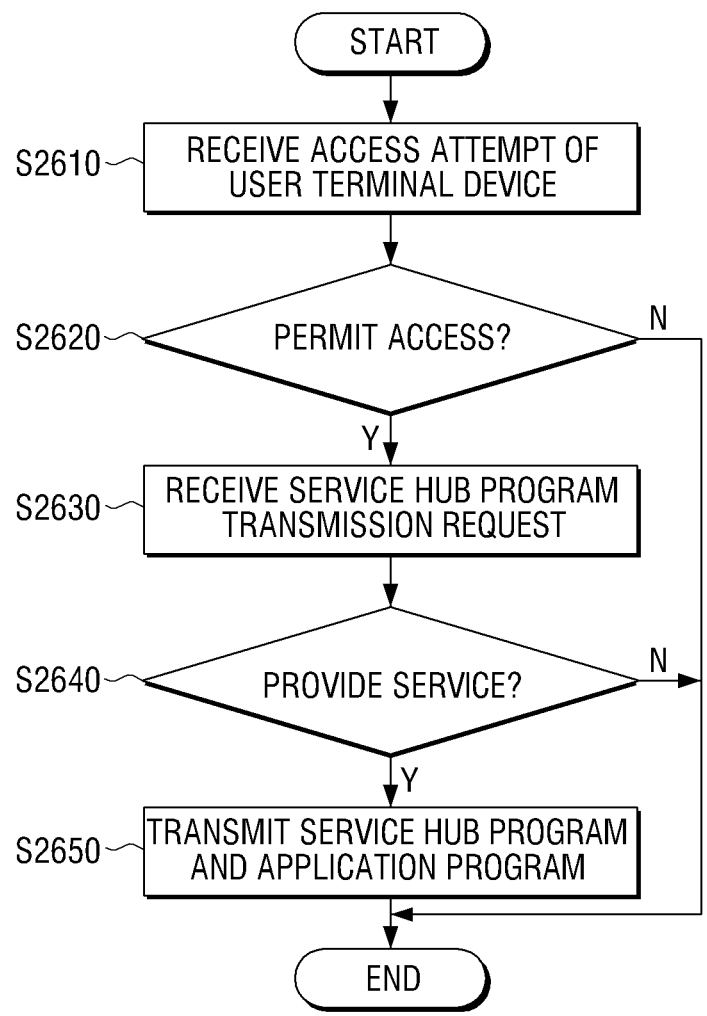
FIGS. 26 and 27 are flowcharts illustrating a service providing method of a server according to various embodiments of the present invention.

FIG. 26 illustrates a service providing method of a server according to an embodiment of the present invention.

Referring to FIG. 26, the server receives an access attempt from a user terminal device in step S2610, and determines whether to permit the access, based on the relevant policy in step S2620. That is, the server blocks the access attempt of the user terminal device belonging to the access-limited organization or the organization of the unregistered service hub.

When permitting the access and receiving the transmission request for the service hub program in step S2630, the server determines, based on the service limit policy, whether to block the service in step S2640. In step S2650, when determining to provide the service, the server transmits the service hub program and the application programs.

Figure 27:
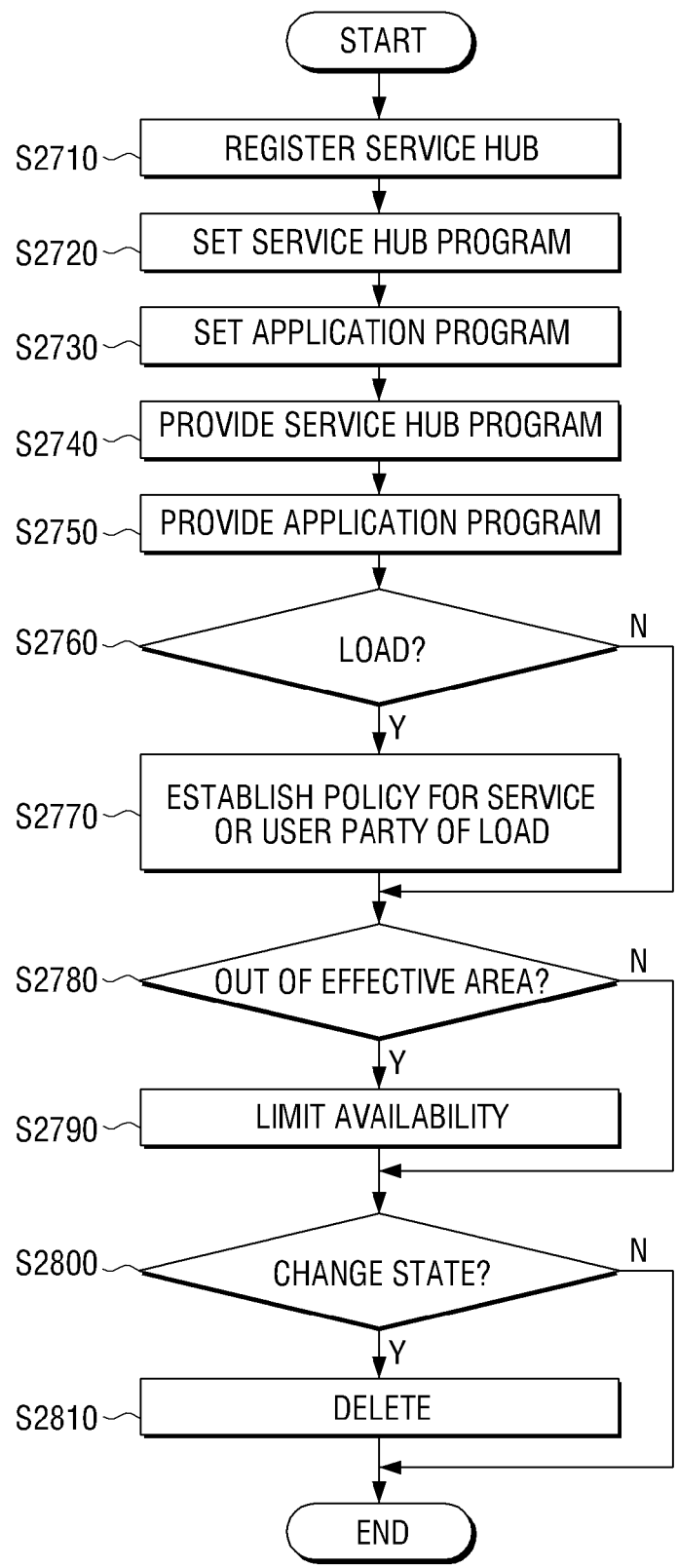

FIG. 27 illustrates a service providing method of a server according to an embodiment of the present invention.

Referring to FIG. 27, a service hub is registered in step S2710, and the server sets the corresponding service hub program in step S2720. In step S2730, the server sets the application programs. Without the separate setting, all of the default application programs can be set for the corresponding service hub program, and instead, application programs selected by the server administrator or the organization operator may be set.

When the user terminal device accesses the server, the server provides the service hub program in step S2740, and provides the application programs in step S2750. Before providing these programs, the authentication can be performed.

When the load occurs in a particular user party or in the service use in step S2760, the server establishes the limit policy for the service or the user party of the load in step S2770. When the terminal device requesting the service or the terminal device belonging to the user party requests the access or the program download, the server blocks the attempt.

The server frequently or periodically checks whether the user terminal device leaves the effective area in step S2780, and thus limits the availability in step S2790.

The server may frequently or periodically check whether the state is changed in step S2800 and delete the program and at least one of the content in step S2810. As such, the server provides various services to each user terminal device registered to the service hub and blocks the service use, if necessary, so that the users of the user terminal devices can easily utilize the device while maintaining the security.

Although the service hub program and the application program are described above, the provision for the service hub is not limited to the service hub program and the application program. That is, basic content such as general data can be provided per service hub and per service group.

The information of the organizations provided with the service hub may be shared with the authorized external institution so that the external institutions can develop the usable application programs for the service hub and the organizations and register them to the server. The server can store the registered program to the content server unit and the open server unit, and provide the program to the service hubs if necessary, thereby reinforcing the serviceability of the service hub.

That is, the application program developer freely develops the application program using the various sharable information provided from the server and registers it to the server. The server allocates the ID to the registered application program and manages the application program. The server allocates the service hub ID to the organization requesting the service and registers the service hub. In particular, the server allocates the server space to the organization or the individual who intends to manage the service hub and allows the direct management. By contrast, the server may directly manage for the organization or the individual that wants the management agent.

As described above, the service provided from the server targets the organization such as enterprise. Accordingly, this service may be referred to as a Business to Business (B2B) service.

Additionally, while various terms including the service hub, the service hub program, and the icon container are used in the description above, these terms indicate the service for integrally managing and supporting the plurality of the services and may be expressed as other terms of the same meaning.

The service providing methods described above can also be stored to various recording media and implemented by program codes executed by a Central Processing Unit CPU of a user terminal device or a server.

More specifically, the codes for executing the above service providing methods can be stored to various recording media readable by the terminal or server, such as a Random Access Memory (RAM), a flash memory, a Read Only Memory (ROM), an Erasable Programmable ROM (EPROM), an Electronically Erasable and Programmable ROM (EEPROM), a register, a hard disc, a removable disc, a memory card, a Universal Serial Bus (USB) memory, and a CD-ROM.

Although certain embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims and any equivalents thereof.

What is claimed is:

1. A service providing method in a user terminal device, the method comprising:
   transmitting, to the server, unique information of the user terminal device, the user information, and identification information of a service hub program;
   downloading, by the user terminal device, a service hub program that is provided to all users of an organization that requests the service hub program;
   installing the service hub program;
   displaying an icon container corresponding to the service hub program;
   receiving, from the server, a list and icons of application program corresponding to the service hub program and the user terminal device;
   displaying the received application icons included in the icon container when an input selecting the icon container is received; and
   receiving a selection of at least one of the plurality of application icons; and
   downloading an application program, corresponding to the at least one selected application icon, from a server;
   wherein the list of application programs corresponding to the service hub program and the user terminal device includes an application program to be provided for an organization and a group to which a user of the user terminal device belongs.

2. The method of claim 1, further comprising:
   receiving a deletion command; and
   deleting at least one of the icon container, all icons included in the icon container, and data stored when performing application programs according to the deletion command.

3. The method of claim 1, further comprising authenticating the user terminal device, prior to downloading the service hub program, by transmitting, to the server, unique information of the user terminal device and user information.

4. The method of claim 1, further comprising:
   downloading application programs included in the list of application programs corresponding to the service hub program and the user terminal device; and
   installing the application programs.

5. The method of claim 1, further comprising:
   confirming a location of the user terminal device; and deleting the programs and the data installed in the user terminal device, if the location of the user terminal device leaves an effective area.

6. A user terminal device comprising:
a memory that stores a service hub program and an application program corresponding to the service hub program that is provided to all users of an organization that requests the service hub program;
a display that displays an icon container corresponding to the service hub program; and
a controller that controls the display to display a plurality of application icons contained in the icon container when the icon container is selected, receives a selection of at least one of the plurality of application icons; and downloads an application program, corresponding to the at least one selected application icon, from a server,
wherein the controller executes the service hub program, transmits user information, unique information of the user terminal device, and identification information of the service hub program to the server, receives a list regarding an application program corresponding to the service hub program and a list regarding an icon of the application program from the server, and generates the icon container including the icon regarding the application program and provides the icon container to the display, and
wherein the list regarding the application program corresponding to the service hub program includes an application program for an organization and a group to which a user of the user terminal device belongs.

7. The user terminal device of claim 6, further comprising:
a communication unit that downloads the service hub program and the application program from the server.

8. The user terminal device of claim 7, wherein, when a list of programs to be deleted is received from the server, the controller deletes application programs according to the list.

9. The user terminal device of claim 7, wherein, if a deletion command to delete all application programs corresponding to the service hub program from the server is received, the controller deletes all of the application programs corresponding to the service hub program according to the deletion command.

10. The user terminal device of claim 6, wherein the controller deletes at least one of the icon container, all icons included in the icon container, and all data stored when performing application programs according to a deletion command.

11. The user terminal device of claim 6, further comprising an input unit.

12. The user terminal device of claim 6, wherein the controller downloads application programs included in the list regarding the application program corresponding to the service hub program from the server and installs the downloaded programs in the memory.

13. The user terminal device of claim 6, further comprising:
a location calculation unit that calculates location information of the user terminal device,
wherein the controller, if the location of the user terminal device leaves an effective area, deletes at least one of the programs and the data installed in the user terminal device.

14. A user terminal device comprising:
an authentication manager that performs authentication by transmitting unique information and user information of the user terminal device to a server;
a download manager that downloads a service hub program, an application program list associated with the service hub program, and an application icon list associated with the application program list from the server, when authentication is successful;
a display controller that displays an icon container including a plurality of application icons corresponding to the application icon list on a display screen; and
wherein the service hub program is provided to all users of an organization that requests the service hub program, and
wherein if a selection of at least one of the plurality of application icons is received, the user terminal device:
downloads an application program, corresponding to the at least one selected application icon, from the server,
transmits, to the server, unique information of the user terminal device, the user information, and identification information of the service hub program, and
receives, from the server, a list of application programs corresponding to the service hub program and the user terminal device, and a list icons for the application programs, and
wherein the list of application programs corresponding to the service hub program and the user terminal device includes an application program to be provided for an organization and a group to which a user of the user terminal device belongs.

15. The user terminal device of claim 14, wherein a deletion manager receives a list of programs to be deleted from the server and deletes the application programs according to the list.

16. The user terminal device of claim 15, wherein the deletion manager deletes all application programs corresponding to the service hub program, when a command to delete all of the application programs corresponding to the service hub program is received from the server.

17. The method of claim 1, further comprising;
deleting a program and data installed in the user terminal device according to a change in status of the user terminal device.

18. The method of claim 17, wherein deleting the program and the data installed in the user terminal comprises:
receiving, from the server, a list of programs to be deleted; and
deleting application programs according to the list.

19. The method of claim 17, wherein deleting the program and the data installed in the user terminal comprises:
wherein deleting the program and the data installed in the user terminal comprises:
receiving, from the server, a deletion command to delete all application programs corresponding to the service hub program; and
deleting all of the application programs according to the deletion command.

20. The user terminal device of claim 6, wherein the controller deletes at least one of programs and data installed in the user terminal device according to a change in status of the user terminal device.

21. The user terminal device of claim 20, wherein the controller receives a list of programs to be deleted from the server and deletes the application programs according to the list.

22. The user terminal device of claim 21, wherein controller deletes all application programs corresponding to the service hub program, when a command to delete all of the application programs corresponding to the service hub program is received from the server.

23. The user terminal device of claim 14, further comprising;
   a deletion manager that deletes at least one of programs and data installed in the user terminal device according to a change in status of the user terminal device.

24. The user terminal device of claim 23, wherein the deletion manager receives a list of programs to be deleted from the server and deletes the application programs according to the list.

25. The user terminal device of claim 24, wherein the deletion manager deletes all application programs corresponding to the service hub program, when a command to delete all of the application programs corresponding to the service hub program is received from the server.

* * * * *